(12) United States Patent
Wang et al.

(10) Patent No.: US 8,717,196 B2
(45) Date of Patent: May 6, 2014

(54) DISPLAY APPARATUS FOR VEHICLE

(75) Inventors: Bingchen Wang, Okazaki (JP);
Toshihiro Hattori, Okazaki (JP);
Ichirou Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 1087 days.

(21) Appl. No.: 12/698,372

(22) Filed: Feb. 2, 2010

(65) Prior Publication Data

US 2010/0194596 A1 Aug. 5, 2010

(30) Foreign Application Priority Data

Feb. 3, 2009 (JP) .................................. 2009-22743

(51) Int. Cl.
*G08G 1/01* (2006.01)

(52) U.S. Cl.
USPC ............................ 340/936; 340/938; 348/148

(58) Field of Classification Search
USPC .................................. 340/933, 937, 936, 938
See application file for complete search history.

(56) References Cited

U.S. PATENT DOCUMENTS

| | | | | |
|---|---|---|---|---|
| 5,796,991 | A * | 8/1998 | Shimizu ............................. | 703/1 |
| 6,498,620 | B2 * | 12/2002 | Schofield et al. .............. | 348/148 |
| 6,515,597 | B1 | 2/2003 | Wada et al. | |
| 7,161,616 | B1 * | 1/2007 | Okamoto et al. ............. | 348/148 |
| 7,190,259 | B2 * | 3/2007 | Kumata et al. ................ | 340/435 |
| 7,248,283 | B2 * | 7/2007 | Takagi et al. .................. | 348/118 |
| 7,356,408 | B2 * | 4/2008 | Tsuchiya et al. .............. | 701/538 |
| 8,058,980 | B2 * | 11/2011 | Yanagi et al. ................. | 340/435 |
| 8,259,173 | B2 * | 9/2012 | Iwano ............................. | 348/148 |
| 2002/0167589 | A1 * | 11/2002 | Schofield et al. ............. | 348/148 |
| 2003/0122930 | A1 * | 7/2003 | Schofield et al. ............. | 348/148 |
| 2008/0055114 | A1 * | 3/2008 | Kim et al. ...................... | 340/937 |

FOREIGN PATENT DOCUMENTS

| | | |
|---|---|---|
| JP | A-11-99879 | 4/1999 |
| JP | A-2001-334869 | 12/2001 |
| JP | 2002-019556 A | 1/2002 |
| JP | A-2002-109697 | 4/2002 |
| JP | 2002-354468 A | 12/2002 |
| JP | A-2003-158736 | 5/2003 |
| JP | A-2003-219413 | 7/2003 |
| JP | A-2003-284056 | 10/2003 |
| JP | A-2003-339044 | 11/2003 |
| JP | A-2005-335410 | 12/2005 |
| JP | 2007-036668 A | 2/2007 |

(Continued)

OTHER PUBLICATIONS

Court Hearing mailed on Aug. 21, 2012 related to an Office Action issued in corresponding JP application No. 2009-22743 (and English translation).

(Continued)

*Primary Examiner* — Eric M Blount
(74) *Attorney, Agent, or Firm* — Posz Law Group, PLC

(57) ABSTRACT

A display apparatus for a vehicle includes: a shooting element for shooting a predetermined area around the vehicle to obtain a shot image around the vehicle; an image conversion element for converting coordinates of the shot image to generate a mirror conversion image, wherein the mirror conversion image provides a first image of a first area around the vehicle reflected on an in-vehicle mirror, the first image being viewed from a passenger of the vehicle, and wherein the passenger sits down on a predetermined seat of the vehicle; and a display element for displaying the mirror conversion image.

6 Claims, 26 Drawing Sheets

(56) References Cited

FOREIGN PATENT DOCUMENTS

| | | |
|---|---|---|
| JP | A-2007-210460 | 8/2007 |
| JP | 2007-235529 A | 9/2007 |
| JP | A-2008-24138 | 2/2008 |
| JP | A-2008-174075 | 7/2008 |
| WO | WO 00/64175 A1 | 10/2000 |

OTHER PUBLICATIONS

Notice of Reasons for Refusal mailed on Feb. 1, 2011 issued from the Japanese Patent Office in the corresponding Japanese patent application No. 2009-022743 (and English translation).

Office Action mailed Nov. 20, 2012 in corresponding JP Application No. 2011-26016 (and English translation).

Office Action mailed Nov. 12, 2013 in the corresponding JP application No. 2013-007211 (English translation).

\* cited by examiner

_DISPLAY APPARATUS FOR VEHICLE_

CROSS REFERENCE TO RELATED APPLICATION

This application is based on Japanese Patent Application No. 2009-22743 filed on Feb. 3, 2009, the disclosure of which is incorporated herein by reference.

FIELD OF THE INVENTION

The present invention relates to a display apparatus mounted on a vehicle for displaying an image around the vehicle.

BACKGROUND OF THE INVENTION

Conventionally, a vehicle display apparatus for supporting the driving in case of parking a vehicle is well known. Specifically, a front image, a rear image, a left side image and a right side image of a vehicle are shot by multiple in-vehicle cameras such as four cameras. Four images are converted to four overhead views showing a diagram prepared by looking down on the vehicle above, and then, four overhead views are combined so that a whole overhead view is generated. The whole overhead view shows a whole image of the vehicle and around the vehicle, which is prepared by looking down from an upper position of the vehicle. The vehicle display apparatus displays the whole overhead image to support the driving.

In the above vehicle display apparatus, when an object as an obstacle for blocking a passage of the vehicle exists around the vehicle and an image of the object is disposed at a boundary between two overhead views, which is prepared by two adjacent cameras, the whole overhead view may not include the image of the object, or the image of the object may not be shown in the whole overhead view clearly.

In view of the above point, a display apparatus for a vehicle is proposed in JP-A-2007-235529. The apparatus switches the whole overhead view to each image shot by a corresponding camera when the apparatus detects the object under a condition that the apparatus displays the whole overhead view.

However, in the above apparatus, when the apparatus displays individual image shot by a corresponding camera, it is difficult for a passenger of the vehicle to recognize a type of the object disposed on a rear side of the vehicle, a distance between the object and the vehicle and a positioning relationship between the object and the vehicle even when the passenger looks at the individual image. This is because the individual image of the camera is different from a view when the passenger directly looks at the object.

SUMMARY OF THE INVENTION

In view of the above-described problem, it is an object of the present disclosure to provide a display apparatus for a vehicle. A passenger of the vehicle easily recognizes an obstacle when the passenger looks at an image displayed on the apparatus.

According to an aspect of the present disclosure, a display apparatus for a vehicle includes: a shooting element for shooting a predetermined area around the vehicle to obtain a shot image around the vehicle; an image conversion element for converting coordinates of the shot image to generate a mirror conversion image, wherein the mirror conversion image provides a first image of a first area around the vehicle reflected on an in-vehicle mirror, the first image being viewed from a passenger of the vehicle, and wherein the passenger sits down on a predetermined seat of the vehicle; and a display element for displaying the mirror conversion image.

In the above apparatus, the passenger recognizes the type of the object and the distance between the object and the vehicle without viewing the image on the mirror.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
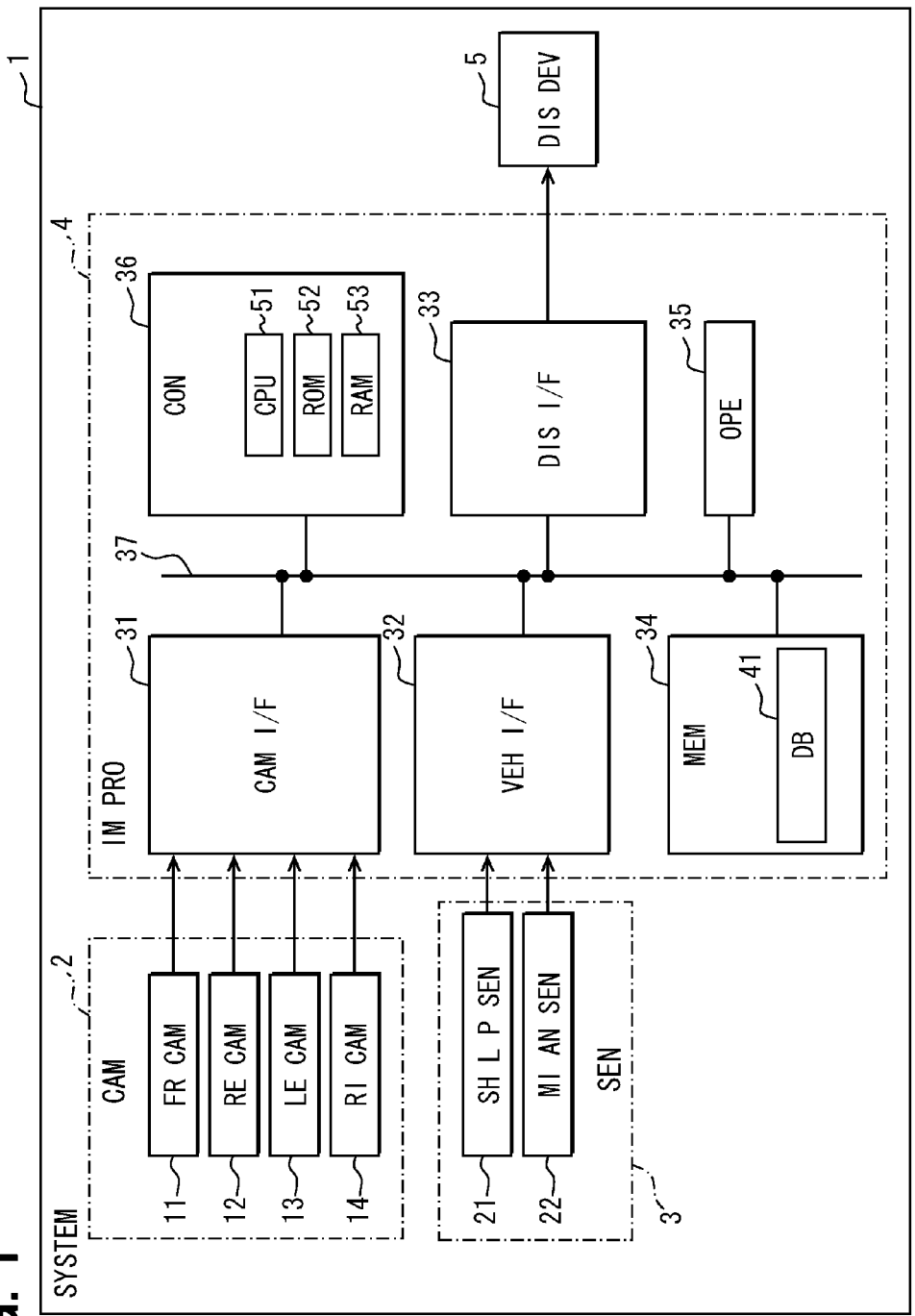
FIG. 1 is a block diagram showing a display system for a vehicle according to a first embodiment.

FIG. 1 shows a display system 1 for a vehicle according to a first embodiment.

The system 1 is mounted on a vehicle. As shown in FIG. 1, the system includes an in-vehicle camera 2 for shooting images continuously around the vehicle, a group of sensors 3 including multiple sensors for detecting vehicle conditions, an image processor 4 for processing images based on a shot image of the camera 2 and detection results of the sensors 3, and a display device 5 for displaying images processed by the processor 4.

The camera 2 includes a front camera 11, a rear camera 12, a left side camera 13 and a right side camera 14. The front camera 11 is arranged in front of the vehicle, specifically, on a front bumper. The front camera 11 shoots an image of a front view of the vehicle. The rear camera 12 is arranged in a rear of the vehicle, specifically, on a rear bumper. The rear camera 12 shoots an image of a rear view of the vehicle. The left side camera 13 is arranged on a left side of the vehicle, specifically, on a left side mirror. The left side camera 13 shoots an image of a left side view of the vehicle. The right side camera 14 is arranged on a right side of the vehicle, specifically, on a right side mirror. The right side camera 14 shoots an image of a right side view of the vehicle.

The sensors 3 include a shift lever position sensor 21 and a mirror angle sensor 22. The shift lever position sensor 21 detects a position of a shift lever of the vehicle. The mirror angle sensor 22 detects slant angles of a left side mirror arranged on the left side of the vehicle, a right side mirror arranged on the right side of the vehicle and a rear view mirror arranged in a compartment of the vehicle.

The image processor 4 includes a camera interface (i.e., camera I/F) 31, a vehicle interface (i.e., vehicle I/F) 32, a display interface (i.e., display I/F) 33, a memory 34, an operation element 35, a controller 36, and a bus 37. The bus 37 couples among the camera I/F 31, the vehicle I/F 32, the display I/F 33, the memory 34, the operation element 35 and the controller 36.

The camera I/F 31 is an interface for inputting images from the front camera 11, the rear camera 12, the left side camera 13 and the right side camera 14.

The vehicle I/F 32 is an interface for inputting signals from various sensors 21, 22. The signals from the sensors 21-22 may be directly input into the processor 4. Alternatively, the signals from the sensors 21-22 may be input into the processor 4 via various ECUs (electric control unit).

The display I/F 33 is an interface for outputting an image data processed by the image processor 4 to the display device 5.

The memory 34 stores various information in a non-volatile memory medium such as a hard diskette. The memory 34 stores a view point conversion map database 41.

The database 41 stores multiple types of view point conversion maps. Here, the view point conversion map is used for generating a conversion image. The conversion image is prepared such that coordinates of the shot image of the camera 2 is converted so that a view point of the conversion image is different from an original view point of the shot image. In the present embodiment, the map includes first to sixth view point conversion maps M1-M6. The first view point conversion map M1 is used for generating the conversion image having a view point of an upper point of the vehicle. The second view point conversion map M2 is used for generating the conversion image having a view point of a passenger such as a driver of the vehicle sitting down a driver seat, the conversion image showing an image of a left side mirror seeing from the driver. The third view point conversion map M3 is used for generating the conversion image having a view point of the passenger, and the conversion image shows an image of a left side mirror seeing from the driver. The fourth view point conversion map M4 is used for generating the conversion image having a view point of the passenger, and the conversion image shows an image of a rear view mirror seeing from the driver. The fifth view point conversion map M5 is used for generating the conversion image, which is prepared by converting coordinates of the shot image of the rear camera 12 such that a left side of the image is reversed to a right side of the image, and the right side of the image is reversed to the left side of the image. The sixth view point conversion map M6 is used for generating the conversion image having a view point of an obliquely upward point in front of the vehicle.

The operation element 35 inputs an instruction from the passenger when the passenger operates the element 35. The element 35 includes multiple leys for being operated by the passenger.

The controller 36 is a micro computer having a CPU 51, a ROM 52, a RAM 53 and the like. The ROM 52 stores a program for executing a periphery image display process in the CPU 51.

Thus, in the system 1, the CPU 51 of the controller 36 executes the periphery image display process for displaying the image around the vehicle.

Figure 2:
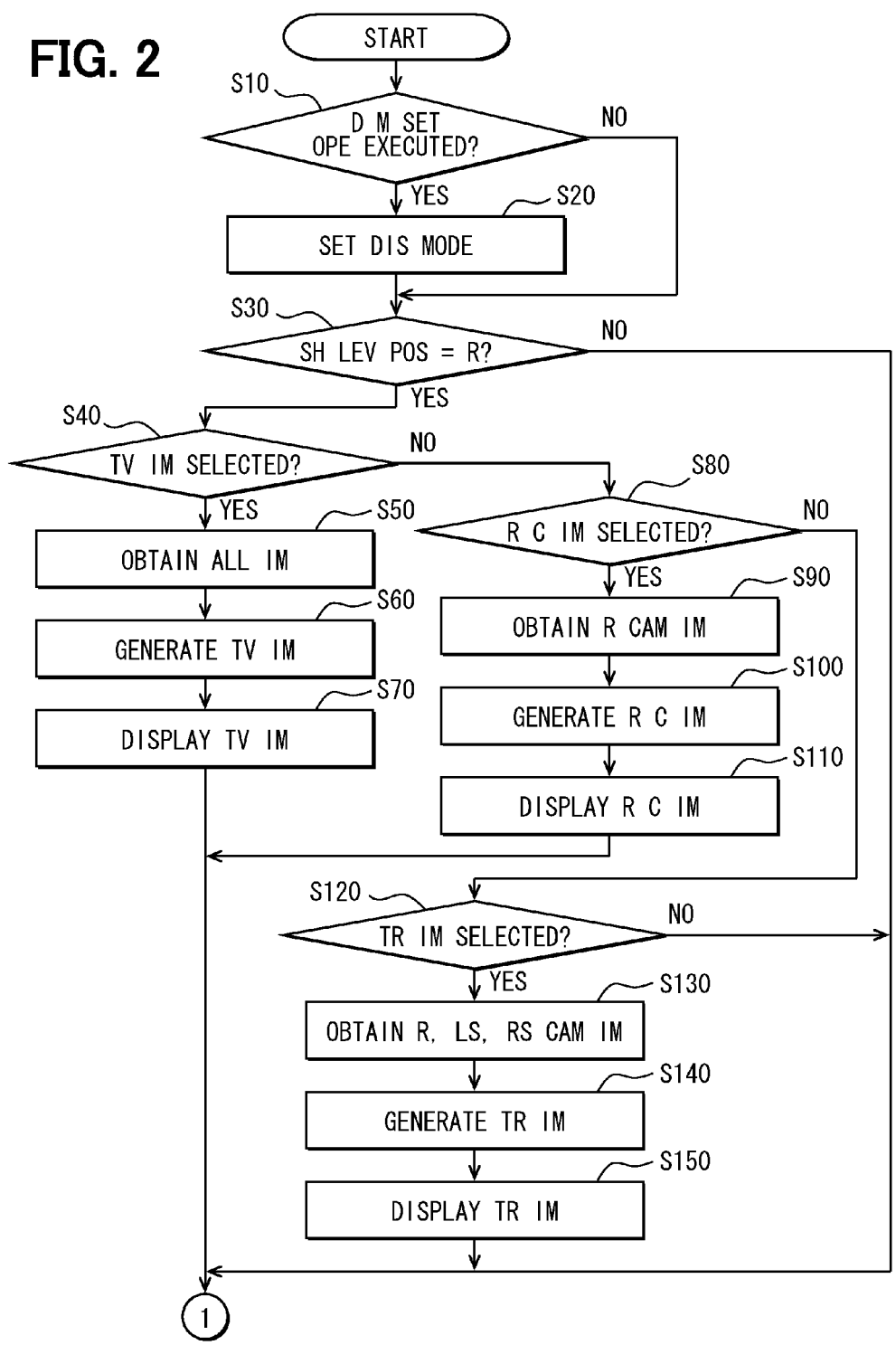
FIGS. 2 and 3 are flowcharts showing a periphery image display process according to the first embodiment.
Figure 3:
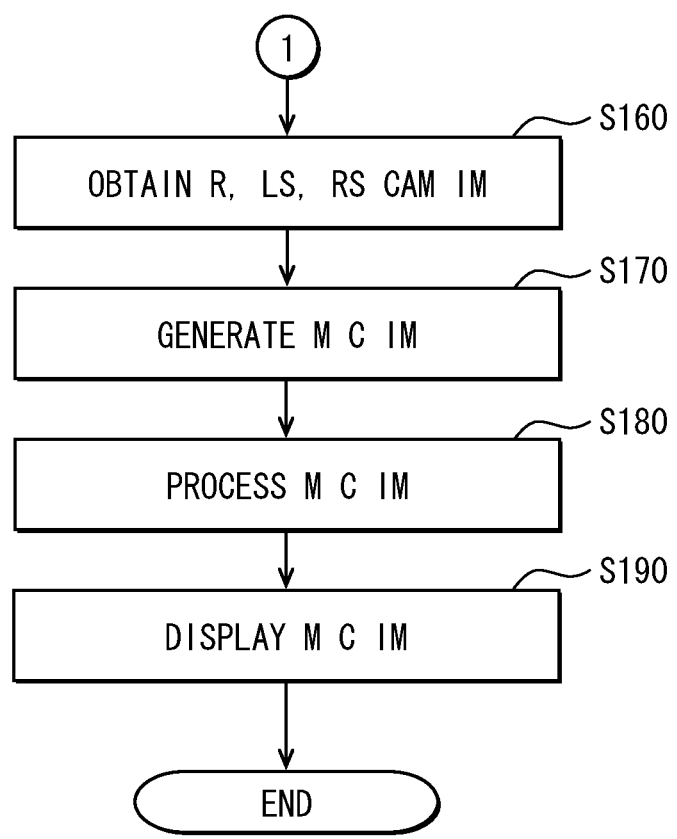

The periphery image display process executed by the CPU 51 will be explained with reference to FIGS. 2 and 3. FIG. 2 shows a first half of the periphery image display process, and FIG. 3 is a second half of the periphery image display process. The periphery image display process is repeatedly executed when the CPU 51 turns on (i.e., switches on).

When the periphery image display process is executed, the CPU 51 determines in step S10 whether operation for setting a display mode of the display device 5 is performed via the operation element 35. Here, the operation for setting the display mode is defined as a display mode setting operation.

The display mode in the present embodiment includes first to eleventh display modes as shown in FIGS. 4A to 8F. The display mode is selected when the passenger operates the operation element 35 so that the display mode setting operation is performed.

Figure 4A:
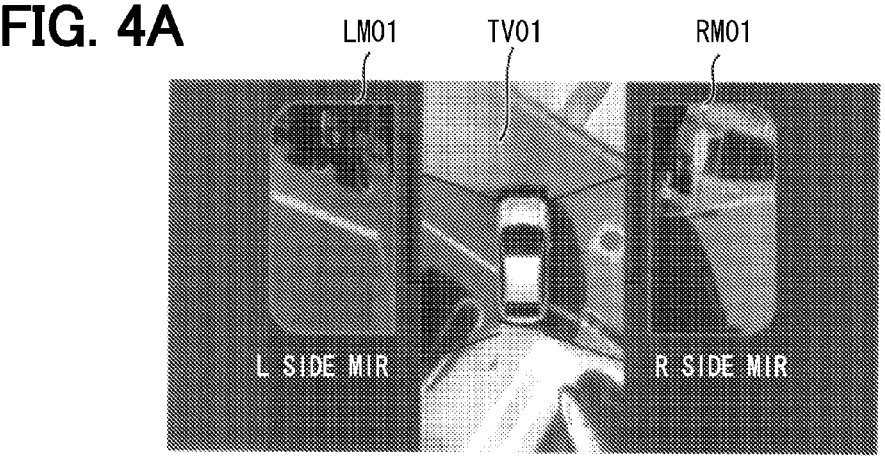
FIGS. 4A to 4C are photographs showing first to third display modes.
Figure 4B:
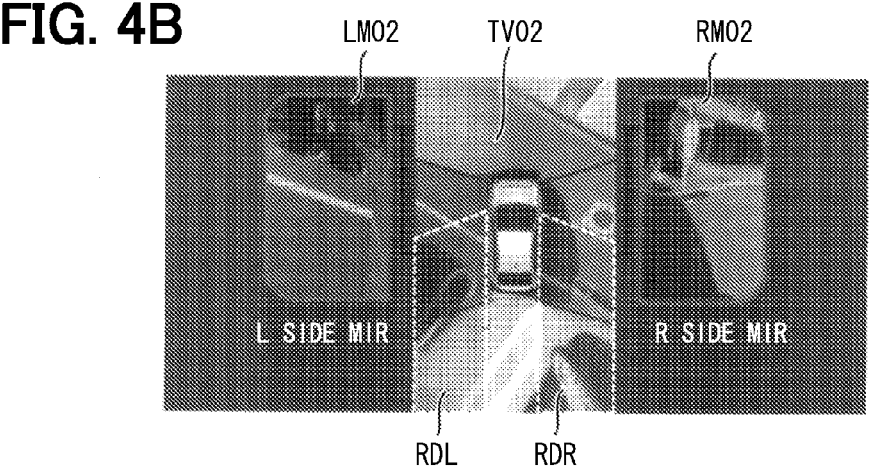
Figure 4C:
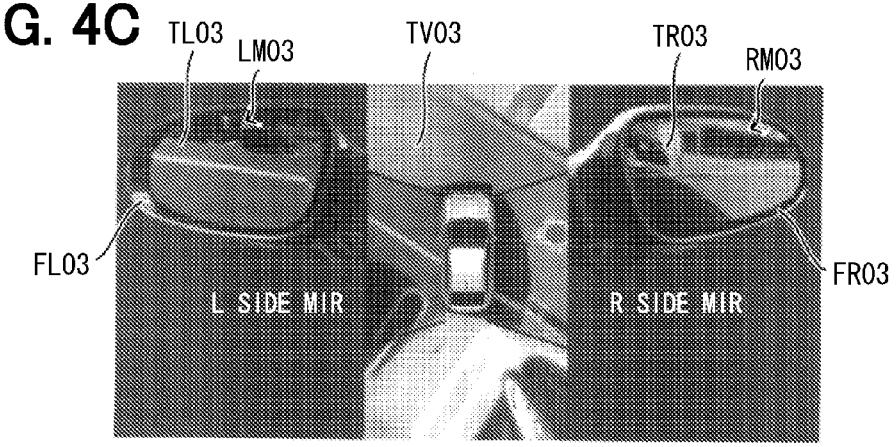
Figure 4D:
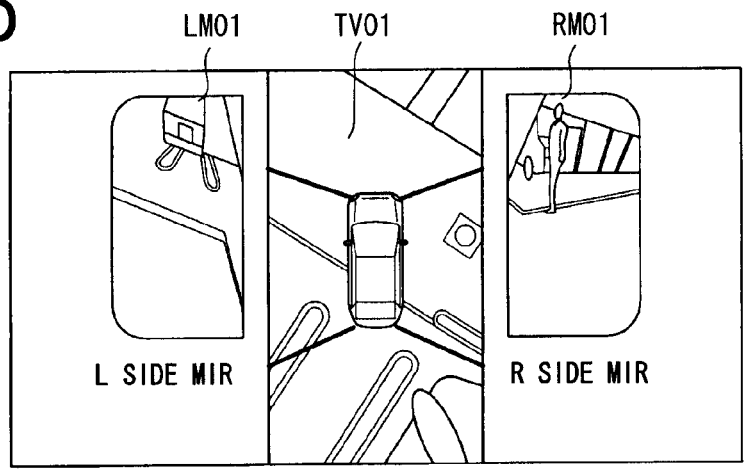
FIGS. 4D to 4F are illustrative diagrams corresponding to FIGS. 4A to 4C, respectively.

The first display mode is shown in FIGS. 4A and 4D. The first display mode provides to display a top view image TV01, a left side mirror image LM01, and a right side mirror image RM01. The top view image TV01 shows an image of the vehicle and around the vehicle seeing from an upper view point of the vehicle. The left side mirror image LM01 shows an image of the left side mirror seeing from a view point of a driver. The right side mirror image RM01 shows an image of the right side mirror seeing from the view point of the driver. In the first display mode, the top view image TV01 is displayed at a center portion of a screen of the display device 5. The left side mirror image LM01 is displayed on a left side of the screen, and the right side mirror image RM01 is displayed on a right side of the screen. The left and right side mirror images LM01, RM01 have a display region with a rectangular shape.

Figure 4E:
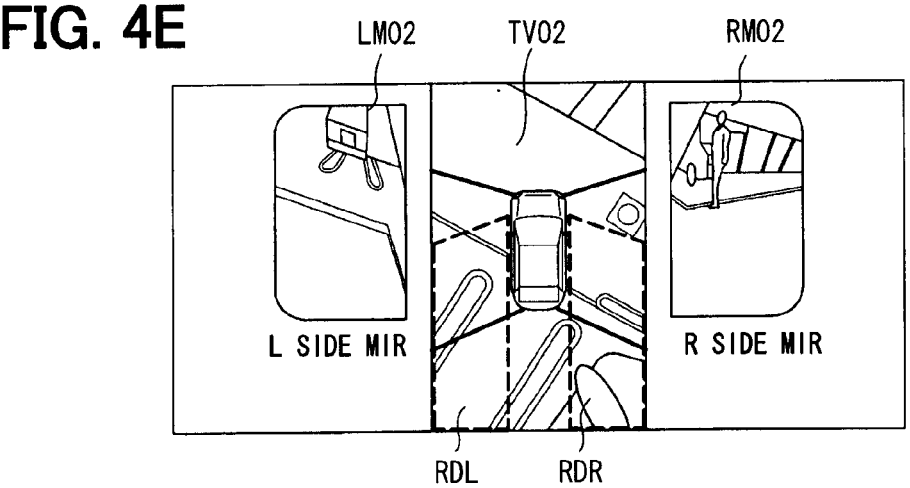

The second display mode is shown in FIGS. 4B and 4E. The second display mode provides to display the top view image TV02, the left side mirror image LM02 and the right side mirror image RM02. In the second display mode, the top view image TV02 is displayed at the center portion of the screen of the display device 5. The left side mirror image LM02 is displayed on the left side of the screen, and the right side mirror image RM02 is displayed on the right side of the screen. The left and right side mirror images LM02, RM02 have a display region with a rectangular shape. Further, in the top view image TV02, left and right markers RDL, RDR are shown. The left and right markers RDL, RDR provide regions around the vehicle that are shown in the left and right side mirror images LM02, RM02. The left and right markers RDL, RDR are shown as dotted regions in FIGS. 4B and 4E.

Figure 4F:
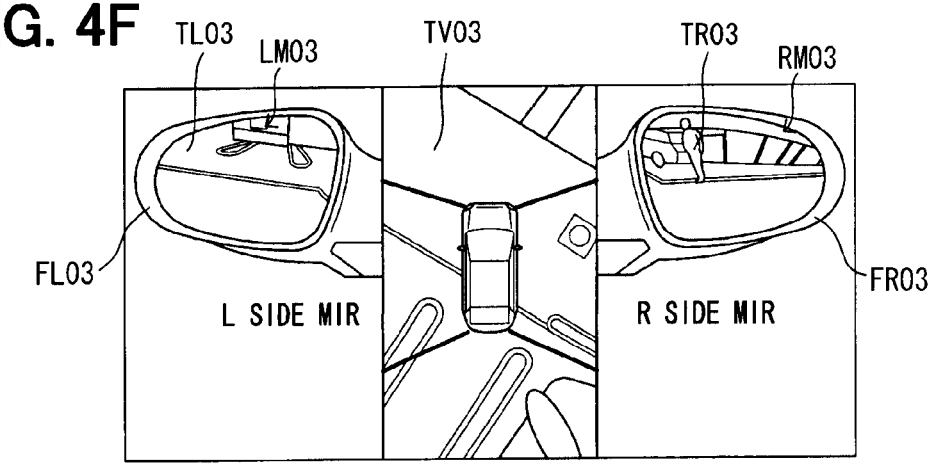

The third display mode is shown in FIGS. 4C and 4F. The third display mode provides to display the top view image TV03, the left side mirror image LM03 and the right side mirror image RM03. In the third display mode, the top view image TV03 is displayed at the center portion of the screen of the display device 5. The left side mirror image LM03 is displayed on the left side of the screen, and the right side mirror image RM03 is displayed on the right side of the screen. The left side mirror image LM03 includes a left mirror frame image FL03 and a left side converted image TL03. The left mirror frame image FL03 has a frame shape, which is the same as the left side mirror of the vehicle on which the system 1 is mounted. The left side converted image TL03 is displayed inside of the left mirror frame image FL03. The right side mirror image RM03 includes a right mirror frame image FR03 and a right side converted image TR03. The right mirror frame image FR03 has a frame shape, which is the same as the right side mirror of the vehicle on which the system 1 is mounted. The right side converted image TR03 is displayed inside of the right mirror frame image FR03.

Figure 5A:
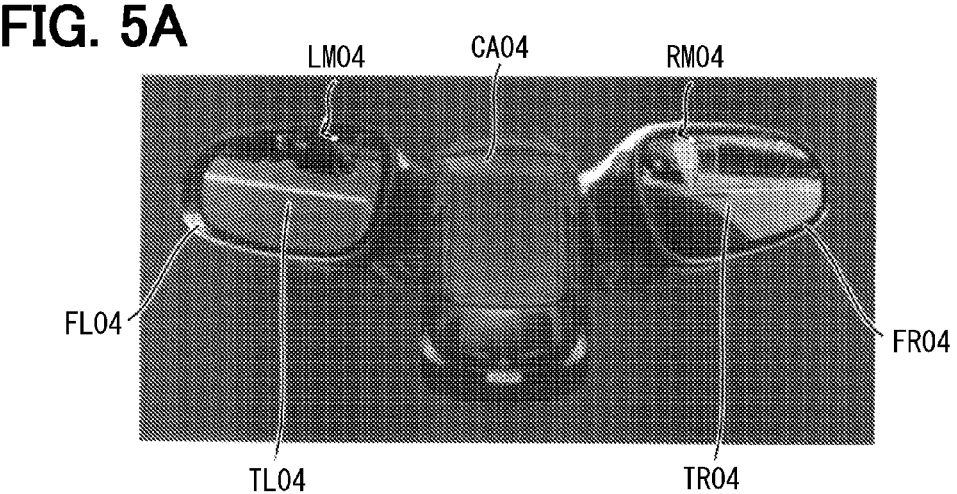
FIGS. 5A to 5C are photographs showing fourth to sixth display modes.
Figure 5B:
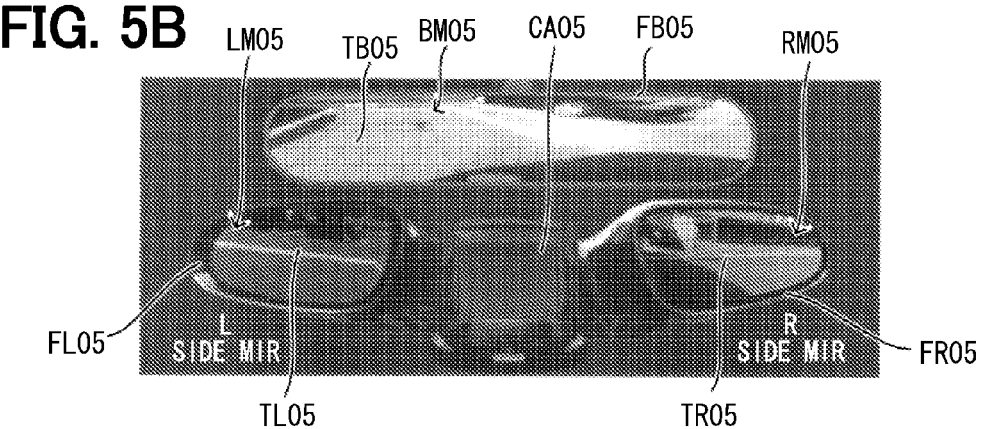
Figure 5C:
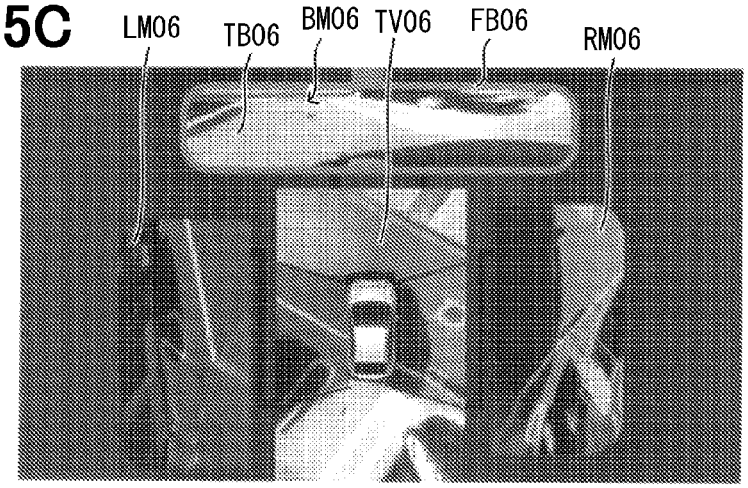
Figure 5D:
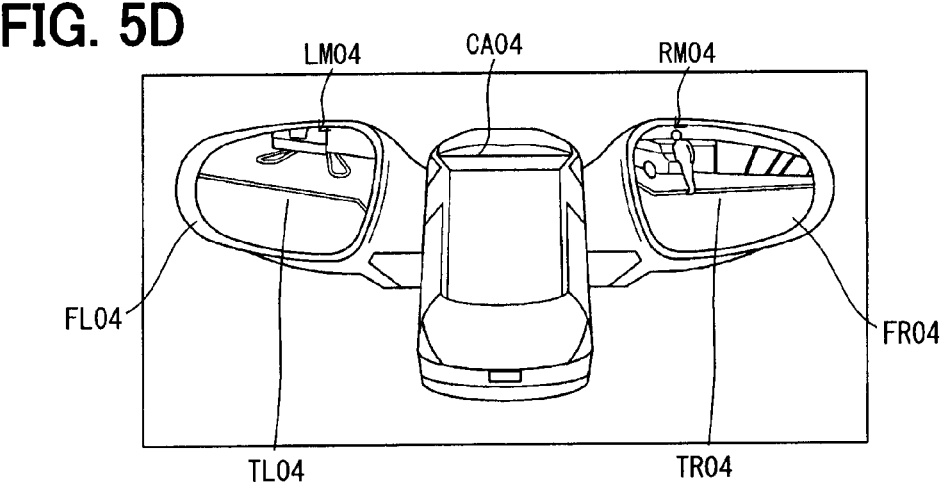
FIGS. 5D to 5F are illustrative diagrams corresponding to FIGS. 5A to 5C, respectively.

The fourth display mode is shown in FIGS. 5A and 5D. The fourth display mode provides to display a vehicle whole image CA04, the left side mirror image LM04 and the right side mirror image RM04. The vehicle whole image CA04 shows a whole image of the vehicle, on which the system 1 is mounted. In the fourth display mode, the vehicle whole image CA04 is displayed at the center portion of the screen of the display device 5. The left side mirror image LM04 is displayed on the left side of the screen, and the right side mirror image RM04 is displayed on the right side of the screen. The left side mirror image LM04 includes a left mirror frame image FL04 and a left side converted image TL04. The left mirror frame image FL04 has a frame shape, which is the same as the left side mirror of the vehicle on which the system 1 is mounted. The left side converted image TL04 is displayed inside of the left mirror frame image FL04. The right side mirror image RM04 includes a right mirror frame image FR04 and a right side converted image TR04. The right mirror frame image FR04 has a frame shape, which is the same as the right side mirror of the vehicle on which the system 1 is mounted. The right side converted image TR04 is displayed inside of the right mirror frame image FR04.

Figure 5E:
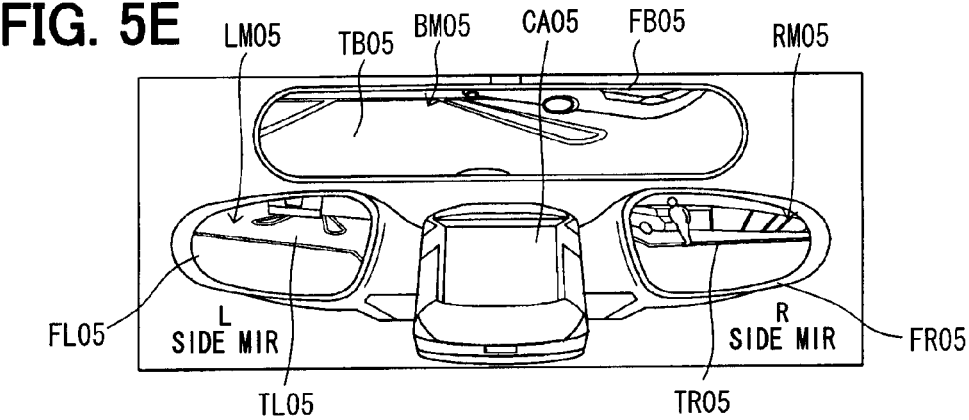

The fifth display mode is shown in FIGS. 5B and 5E. The fifth display mode provides to display the vehicle whole image CA05, the left side mirror image LM05, the right side mirror image RM05 and a rear view mirror image BM05. The rear view mirror image BM05 shows an image of the rear view mirror in the compartment of the vehicle seeing from the view point of a driver. In the fifth display mode, the vehicle whole image CA05 is displayed at the center portion of the screen of the display device 5. The left side mirror image LM05 is displayed on the left side of the screen, and the right side mirror image RM05 is displayed on the right side of the screen. The rear view mirror image BM05 is displayed on an upper side of the screen. The left side mirror image LM05 includes a left mirror frame image FL05 and a left side converted image TL05. The left mirror frame image FL05 has a frame shape, which is the same as the left side mirror of the vehicle on which the system 1 is mounted. The left side converted image TL05 is displayed inside of the left mirror frame image FL05. The right side mirror image RM05 includes a right mirror frame image FR05 and a right side converted image TR05. The right mirror frame image FR05 has a frame shape, which is the same as the right side mirror of the vehicle on which the system 1 is mounted. The right side converted image TR05 is displayed inside of the right mirror frame image FR05. The rear view mirror image BM05 includes a mirror frame image FB05 and a converted image TB05. The mirror frame image FB05 has a frame shape, which is the same as the rear view mirror of the vehicle on which the system 1 is mounted. The converted image TB05 is displayed inside of the mirror frame image FB05.

Figure 5F:
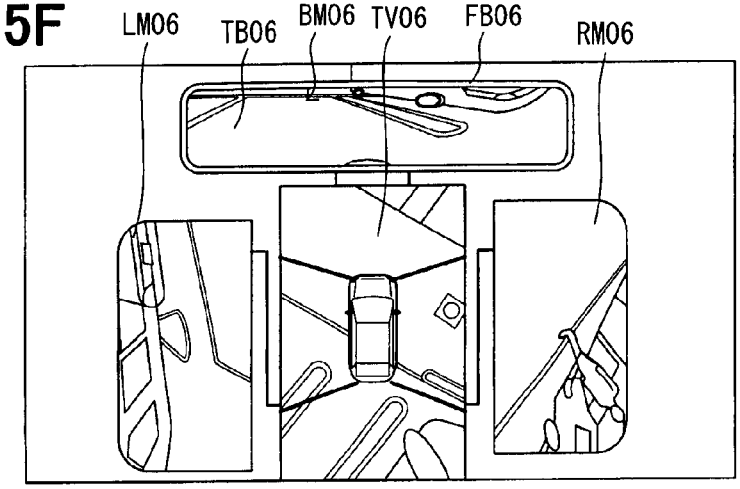

The sixth display mode is shown in FIGS. 5C and 5F. The sixth display mode provides to display the top view image TV06, the left side mirror image LM06, the right side mirror image RM06 and the rear view mirror image BM06. In the sixth display mode, the top view image TV06 is displayed at the center portion of the screen of the display device 5. The left side mirror image LM06 is displayed on the left side of the screen, and the right side mirror image RM06 is displayed on the right side of the screen. The rear view mirror image BM06 is displayed on an upper side of the screen. The left and right side mirror images LM06, RM06 have a display region with a rectangular shape. The rear view mirror image BM06 includes a mirror frame image FB06 and a converted image TB06. The mirror frame image FB06 has a frame shape, which is the same as the rear view mirror of the vehicle on which the system 1 is mounted. The converted image TB06 is displayed inside of the mirror frame image FB05.

Figure 6A:
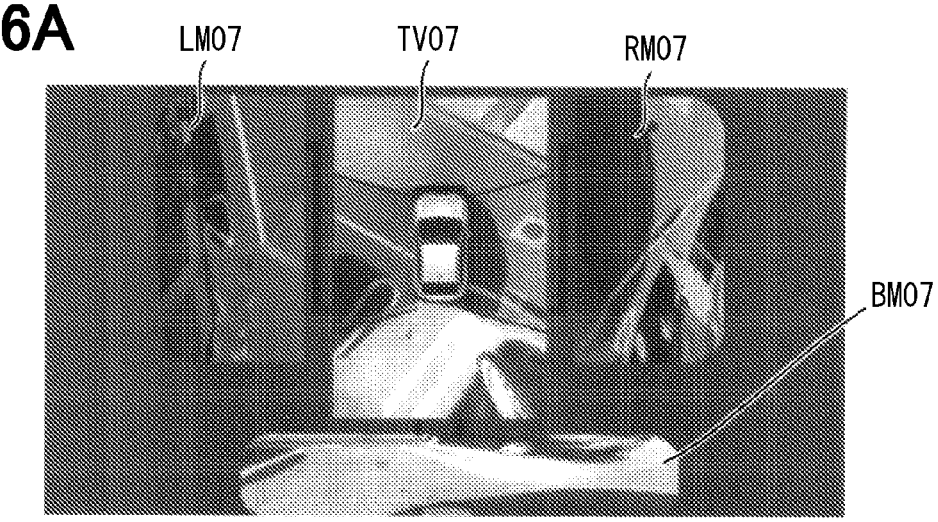
FIGS. 6A to 6C are photographs showing seventh to ninth display modes.
Figure 6B:
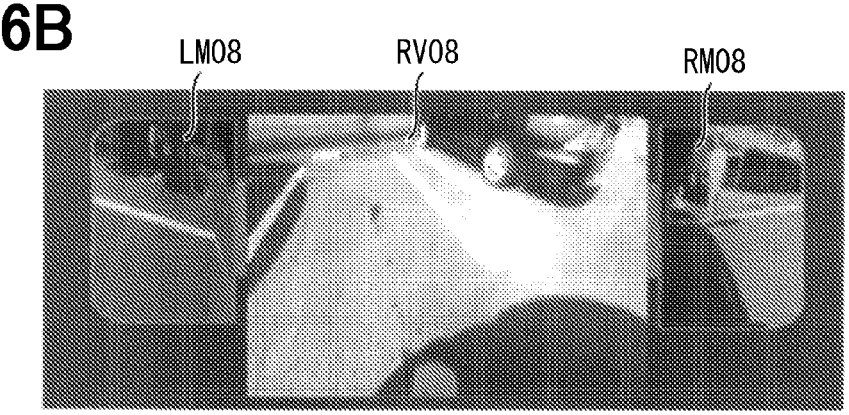
Figure 6C:
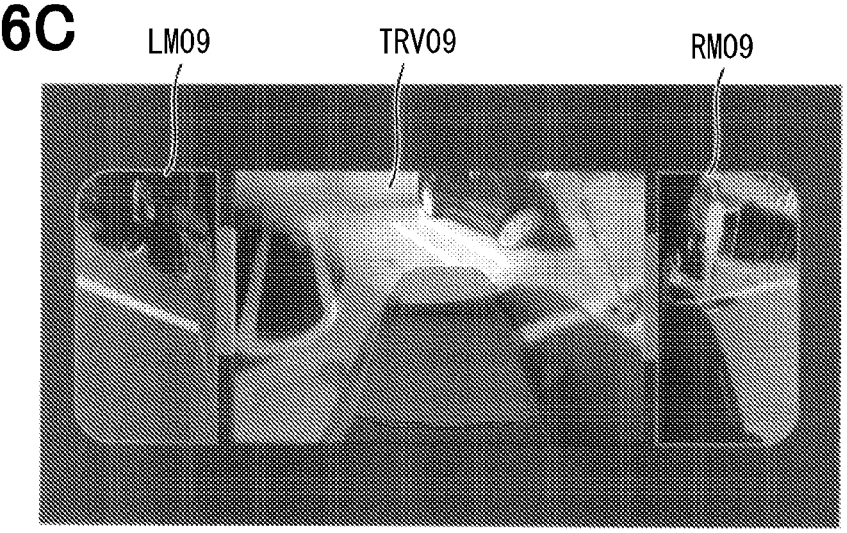
Figure 6D:
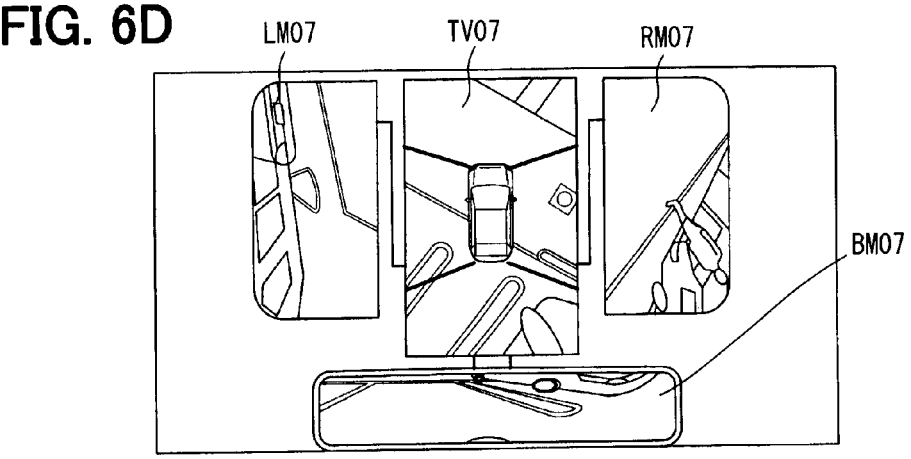
FIGS. 6D to 6F are illustrative diagrams corresponding to FIGS. 6A to 6C, respectively.

The seventh display mode is shown in FIGS. 6A and 6D. The seventh display mode provides to display the top view image TV07, the left side mirror image LM07, the right side mirror image RM07 and the rear view mirror image BM07. In the seventh display mode, the top view image TV07 is displayed at the center portion of the screen of the display device 5. The left side mirror image LM07 is displayed on the left side of the screen, and the right side mirror image RM07 is displayed on the right side of the screen. The rear view mirror image BM07 is displayed on a lower side of the screen. The left and right side mirror images LM07, RM07 and the rear view mirror image BM07 have a display region with a rectangular shape.

Figure 6E:
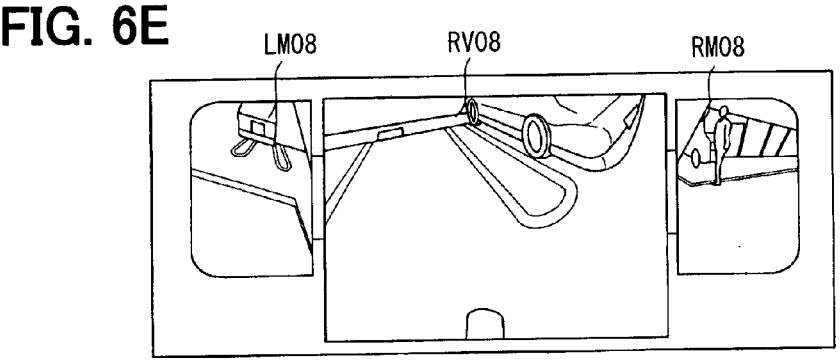

The eighth display mode is shown in FIGS. 6B and 6E. The eighth display mode provides to display a reverse conversion image RV08, the left side mirror image LM08, and the right side mirror image RM08. The reverse conversion image RV08 is prepared by converting coordinates of the shot image of the rear camera 12 in a left-right reversal manner. The reverse conversion image RV08 is defined as rear view reverse conversion image RV08 such that a left side of the shot image is reversed to a right side, and the right side of the shot image is reversed to the left side. In the eighth display mode, the reverse conversion image RV08 is displayed at the center portion of the screen of the display device 5. The left side mirror image LM08 is displayed on the left side of the screen, and the right side mirror image RM08 is displayed on the right side of the screen. The left and right side mirror images LM08, RM08 have a display region with a rectangular shape.

Figure 6F:
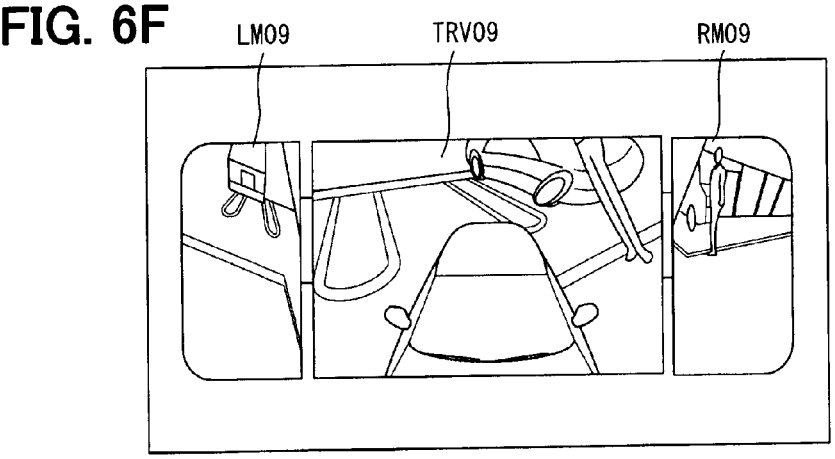

The ninth display mode is shown in FIGS. 6C and 6F. The ninth display mode provides to display a top rear view image TRV09, the left side mirror image LM09, and the right side mirror image RM09. The top rear view image TRV09 is an image of the vehicle seeing from an obliquely upward view point in front of the vehicle. In the ninth display mode, the top rear view image TRV09 is displayed at the center portion of the screen of the display device 5. The left side mirror image LM09 is displayed on the left side of the screen, and the right side mirror image RM09 is displayed on the right side of the screen. The left and right side mirror images LM09, RM09 have a display region with a rectangular shape.

Figure 7A:
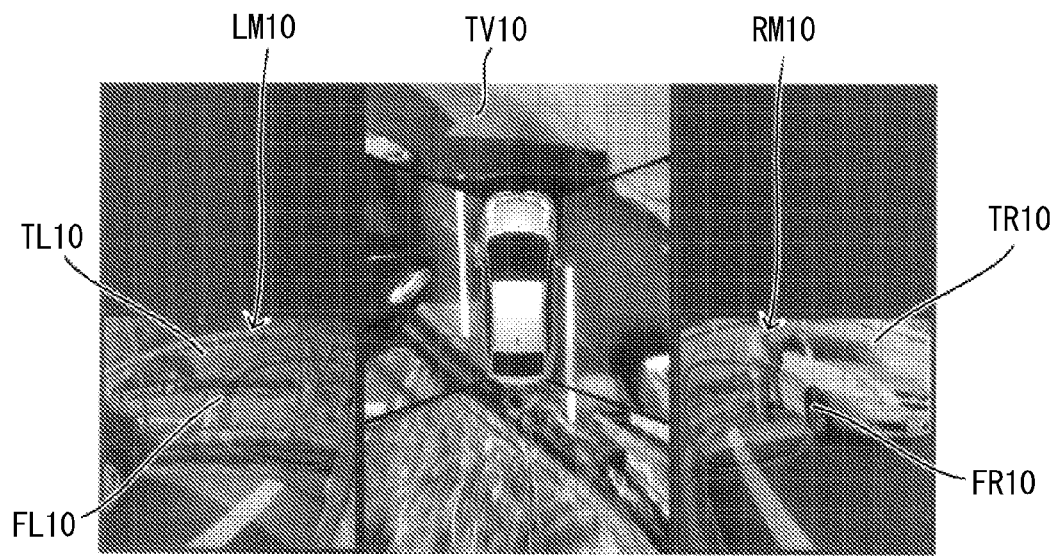
FIG. 7A is a photograph showing a tenth display mode.
Figure 7B:
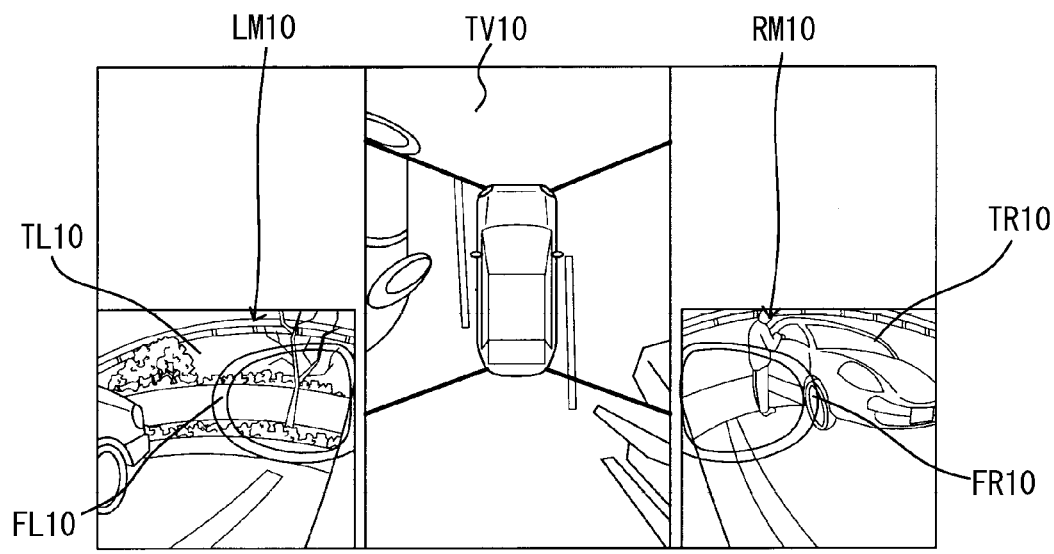
FIG. 7B is a illustrative diagram corresponding to FIG. 7A.

The tenth display mode is shown in FIGS. 7A and 7B. The tenth display mode provides to display the top view image TV10, the left side mirror image LM10, and the right side mirror image RM10. In the tenth display mode, the top view image TV10 is displayed at the center portion of the screen of the display device 5. The left side mirror image LM10 is displayed on the left side of the screen, and the right side mirror image RM10 is displayed on the right side of the screen. The left side mirror image LM10 includes a conversion image TL10 and a mirror frame image FL10. The conversion image TL10 is defined as a side mirror view point conversion image, which is prepared by converting coordinates of the shot image of the left side camera 13 so as to be an image seeing from a view point of the driver through the left side mirror. The mirror frame image FL10 shows a frame translucently with respect to the conversion image TL10, the frame having the same shape as the left side mirror of the vehicle. Specifically, a part of the conversion image TL10 inside of the mirror frame image FL10 corresponds to a view of the driver through the left side mirror. The right side mirror image RM10 includes a conversion image TR10 and a mirror frame image FR10. The conversion image TR10 is defined as a side mirror view point conversion image, which is prepared by converting coordinates of the shot image of the right side camera 14 so as to be an image seeing from a view point of the driver through the right side mirror. The mirror frame image FR10 shows a frame translucently with respect to the conversion image TR10, the frame having the same shape as the right side mirror of the vehicle. Specifically, a part of the conversion image TR10 inside of the mirror frame image FR10 corresponds to a view of the driver through the right side mirror.

Figure 8A:
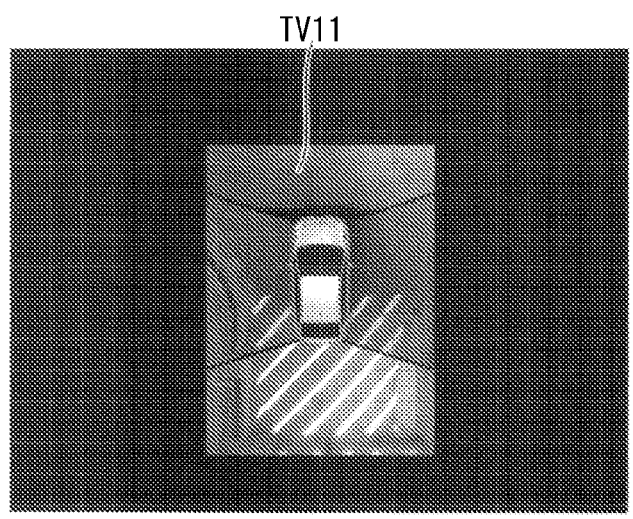
FIGS. 8A to 8C are photographs showing three images of an eleventh display mode.
Figure 8B:
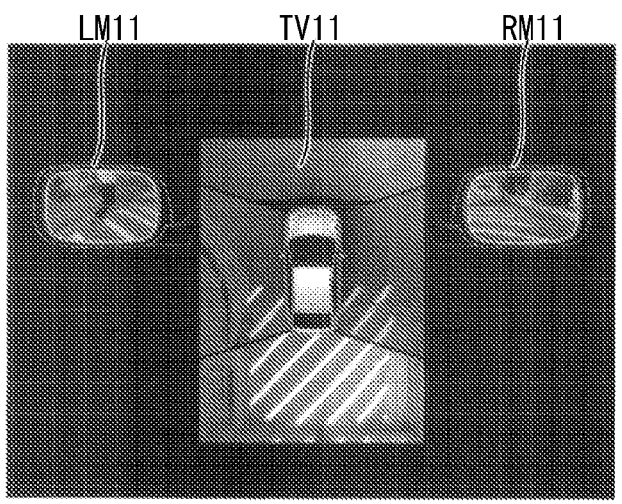
Figure 8C:
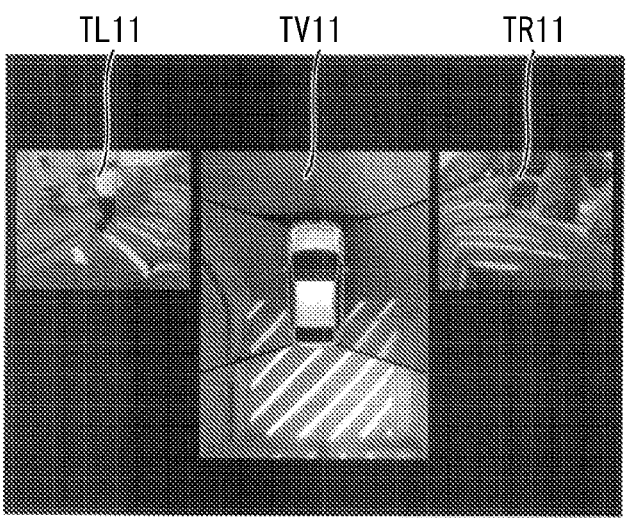
Figure 8D:
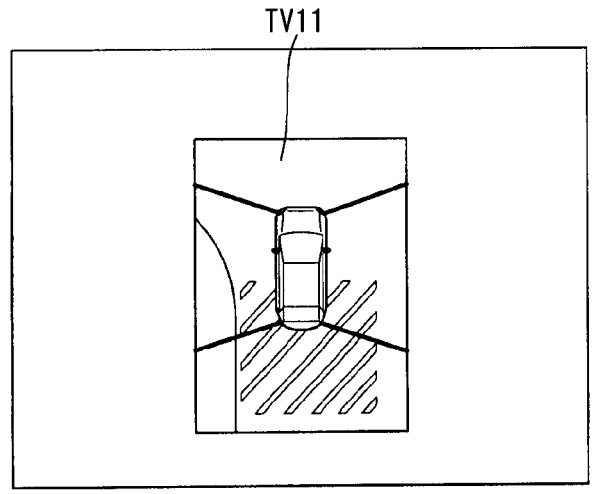
FIGS. 8D to 8F are illustrative diagrams corresponding to FIGS. 8A to 8C, respectively.
Figure 8E:
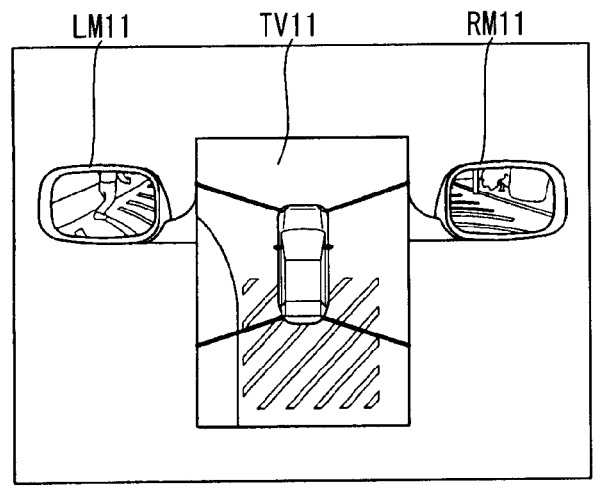
Figure 8F:
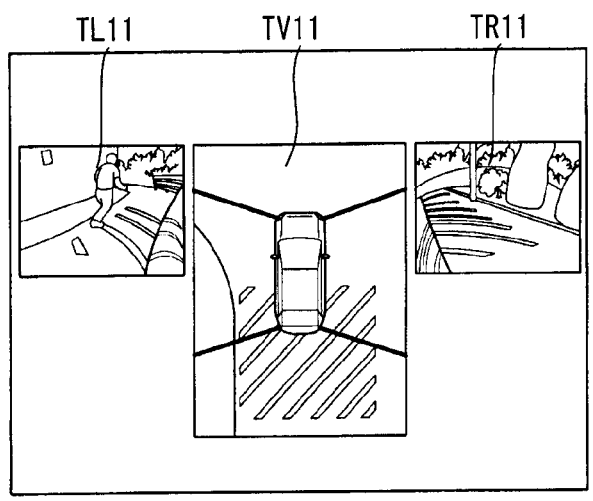

The eleventh display mode is shown in FIGS. 8A to 8F. The eleventh display mode provides to display three scenes, which are changed in a stepwise manner. First, as shown in FIGS. 8A and 8D, the top view image TV11 is displayed at the center portion of the screen of the display device 5. When a predetermined condition for changing the scene is met, a second scene shown in FIGS. 8B and 8E is displayed. In the second scene, the top view image TV11, the left side mirror image LM11 and the right side mirror image RM11 are displayed. Then, another predetermined condition is met, a third scene shown in FIGS. 8C and 8F is displayed. For example, the other condition may be elapsed time. Specifically, when predetermined time such as five seconds has elapsed after starting of the second scene, the third scene is displayed. In the third scene, the top view image TV11, the left side mirror view point conversion image TL11 and the right side mirror view point conversion image TR11 are displayed.

Then, as shown in FIG. 2, when the CPU 51 determines in step S10 that the operation for setting the display mode of the display device 5 is not performed, i.e., when the determination in step S10 is "NO," it goes to step S30. When the CPU 51 determines in step S10 that the operation for setting the display mode of the display device 5 is performed, i.e., when the determination in step S10 is "YES," it goes to step S20. In Step S20, the CPU 51 sets the display mode, which is set by the display mode setting operation, and then, it goes to step S30. For example, when the display mode setting operation provides to set the first display mode, the CPU 51 controls the display device to display the first display mode.

In step S30, based on the signal from the shift lever position sensor 21, the CPU 51 determines whether the position of the shift lever of the vehicle is a reverse position (i.e., "R" position). When the position of the shift lever is not the reverse position of "R," i.e., when the determination of step S30 is "NO," it goes to step S160. When the position of the shift lever is the reverse position of "R," i.e., when the determination of step S30 is "YES," it goes to step S40. In step S40, the CPU 51 determines whether the display mode set in step S20 provides to display the top view image. Specifically, the CPU 51 determines whether the display mode is set to be one of the first, second, third, sixth, seventh, tenth and eleventh display modes.

Here, when the display mode provides to display the top view image i.e., when the determination in step S40 is "YES," it goes to step S50. In step S50, the shot images are obtained from the front camera 11, the rear camera 12, the left side camera 13 and the right side camera 14.

In Step S60, the top view image is generated based on the shot images in step S50. Specifically, coordinates of each of four shot images obtained from the front camera 11, the rear camera 12, the left side camera 13 and the right side camera 14 are converted with using the first view point conversion map M1 stored in the view point conversion map database 41. Then, four converted images are combined by connecting overlapped portions of the four converted images so that the top view image is generated. The top view image provides an overhead view showing the vehicle and a surrounding area of the vehicle. In step S70, the top view image generated in step S60 is displayed on the display device 5 in the display mode set in step S20. Then, it goes to step S160.

In step S40, when the display mode does not provide to display the top view image i.e., when the determination in step S40 is "NO," it goes to step S80. In step S80, the CPU 51 determines whether the display mode provides to display the rear view reverse conversion image. Specifically, the CPU 51 determines whether the eighth display mode is set. When the display mode provides to display the rear view reverse conversion image, i.e., when the determination in step S80 is "YES," it goes to step S90. In step S90, the shot image is obtained from the rear camera 12.

In step S100, the rear view reverse conversion image is generated according to the shot image in step S90. Specifically, coordinates of the shot image of the rear camera 12 are converted with using the fifth view point conversion map M5 stored in the view point conversion map database 41. Thus, the rear view reverse conversion image is obtained. Further, in step S110, the rear view reverse conversion image is displayed on the display device 5 in the display mode set in step S20. Then, it goes to step S160.

In step S80, when the display mode does not provide to display the rear view reverse conversion image, i.e., when the determination in step S80 is "NO," it goes to step S120. In step S120, the CPU 51 determines whether the display mode provides to display the top rear view image. Specifically, the CPU 51 determines whether the ninth display mode is set. When the display mode provides to display the top rear view image, i.e., when the determination in step S120 is "YES," it goes to step S130. In step S130, the shot images are obtained from the rear camera 12, the left side camera 13 and the right side camera 14.

In step S140, the top rear view image is generated according to the shot images in step S130. Specifically, coordinates of each of three shot images of the rear camera 12, the left side camera 13 and the right side camera 14 are converted with using the sixth view point conversion map M6 stored in the view point conversion map database 41. After that, three converted images are combined by connecting overlapped portions of the three converted images. Thus, the top rear view image is obtained. Further, in step S150, the top rear view image in step S140 is displayed on the display device 5 in the display mode set in step S20. Then, it goes to step S160.

When the display mode does not provide to display the top rear view image, i.e., when the determination in step S120 is "NO," it goes to step S160.

As shown in FIG. 3, in step S160, the shot images are obtained from the rear camera 12, the left side camera 13 and the right side camera 14. In step S170, a converted image of the left side mirror seeing from the driver (i.e., a left side mirror conversion image), a converted image of the right side mirror seeing from the driver (i.e., a right side mirror conversion image), and a converted image of the rear view mirror seeing from the driver (i.e., a rear view mirror conversion image) are generated according to the shot images in step S160. Specifically, coordinates of the shot image obtained from the left side camera 13 are converted with using the second view point conversion map M2 stored in the view point conversion map database 41 based on the detection result of the mirror angle sensor 22. Thus, the left side mirror conversion image is changed according to the slant angle of the left side mirror. Further, coordinates of the shot image obtained from the right side camera 14 are converted with using the third view point conversion map M3 stored in the view point conversion map database 41 based on the detection result of the mirror angle sensor 22. Thus, the right side mirror conversion image is changed according to the slant angle of the right side mirror. Furthermore, coordinates of the shot image obtained from the rear view camera 12 are converted with using the fourth view point conversion map M4 stored in the view point conversion map database 41 based on the detection result of the mirror angle sensor 22. Thus, the rear view mirror conversion image is changed according to the slant angle of the rear view mirror.

Then, in step S180, the left side mirror conversion image, the right side mirror conversion image and the rear view mirror conversion image are processed according to the display mode set in step S20. For example, when the display mode is set to be the fifth display mode, the left mirror frame image FL05 is added in the left side mirror conversion image so that the left side mirror image LM05 is generated. Further, the right mirror frame image FR05 is added in the right side mirror conversion image so that the right side mirror image RM05 is generated. Furthermore, the rear view mirror frame image FB05 is added in the rear view mirror conversion image so that the rear view mirror image BM05 is generated.

In step S190, the processed image generated in step S180 is displayed on the display device 5. Thus, the periphery image display process temporary ends. Here, in step S190, when the display mode is the fourth or fifth display mode, the vehicle whole image CA04 or CA05 is added in the left side mirror conversion image, the right side mirror conversion image and the rear view mirror conversion image. Then, the processed image generated in step S180 is displayed on the display device 5.

Thus, in the display system 1, the rear side, the left side and the right side of the vehicle are shot by the rear camera 12, the left side camera 13 and the right side camera 14 repeatedly. Thus, the shot images are obtained in step S160. The shot images are defined as a periphery shot images. Then, the left side mirror conversion image, the right side mirror conversion image and the rear view mirror conversion image are generated by converting the coordinates of the periphery shot images in step S170. Here, the left side mirror conversion image shows the image of the left side mirror seeing from the driver when the driver sits down on the driver seat and the driver views the left side mirror. The right side mirror conversion image shows the image of the right side mirror seeing from the driver when the driver sits down on the driver seat and the driver views the right side mirror. The rear view mirror conversion image shows the image of the rear view mirror seeing from the driver when the driver sits down on the driver seat and the driver views the rear view mirror. Then, the left side mirror conversion image, the right side mirror conversion image and the rear view mirror conversion image are displayed in step S190. Here, the left side mirror, the right side mirror and the rear view mirror are defined as an in-vehicle mirror. The left side mirror conversion image, the right side mirror conversion image and the rear view mirror conversion image are defined as a mirror conversion image.

Thus, in the system 1, the image of the in-vehicle mirror is displayed in a case where the image of the in-vehicle mirror is viewed from the driver view point. In general, the driver confirms an object disposed on the rear side of the vehicle with the image reflected on the in-vehicle mirror. Thus, when the driver sees the image reflected on the in-vehicle mirror, the driver figures out a status of the objects such as a type of the object, a distance between the object and the vehicle and the like. Thus, in the system 1, the driver can figure out the type of the object and the distance to the object without directly viewing the in-vehicle mirror.

In the third to fifth and tenth to eleventh display modes, the mirror frame image showing the frame of the in-vehicle mirror is displayed. Further, the mirror conversion image in the mirror frame image is displayed. Thus, since the mirror frame image is displayed on the outside of the mirror conversion image, the passenger easily recognizes that the mirror conversion image corresponds to the image reflected on the in-vehicle mirror.

In the third to fifth and tenth display modes, the mirror frame image shows the same as the frame of the in-vehicle mirror. Accordingly, the passenger easily recognizes that the mirror conversion image corresponds to the image reflected on the in-vehicle mirror.

In the tenth display mode, the tenth display mode provides to display the left side mirror image, which includes the image of the left side mirror viewed from the view point of the driver when the driver sees the left side mirror. The image of the left side mirror is defined as a driver mirror image. The left side mirror image further includes the image showing a periphery region of the shot area corresponding to the driver mirror image. The image showing the periphery region is arranged around the driver mirror image. A part of the left side mirror conversion image corresponding to the driver mirror image is displayed in the frame showing the mirror frame image. The frame showing the mirror frame image is translucently displayed in the left side mirror conversion image. Further, the tenth display mode further provides to display the right side mirror image, which includes the image of the right side mirror viewed from the view point of the driver when the driver sees the right side mirror. The image of the right side mirror is defined as a driver mirror image. The right side mirror image further includes the image showing a periphery region of the shot area corresponding to the driver mirror image. The image showing the periphery region is arranged around the driver mirror image. A part of the right side mirror conversion image corresponding to the driver mirror image is displayed in the frame showing the mirror frame image. The frame showing the mirror frame image is translucently displayed in the right side mirror conversion image. Accordingly, the driver mirror image showing the image of the in-vehicle mirror viewed from the view point of the driver when the driver sees the in-vehicle mirror is displayed, and further, the image of the periphery region of the driver mirror image is displayed. Thus, the driver can recognizes a wide area, which is wider than the driver mirror image when the driver sees the in-vehicle mirror. Further, the image of the frame shown in the mirror frame image is translucently displayed in the mirror conversion image. Accordingly, the boundary image between the driver mirror image and the periphery region image around the driver mirror image is clearly displayed without hiding behind the mirror frame image.

Further, the left side mirror, the right side mirror and the rear view mirror are attached on the vehicle. Regarding multiple driver mirror images corresponding to the left side mirror, the right side mirror and the rear view mirror, multiple mirror conversion images showing the driver mirror images are displayed on the same display screen. Accordingly, when the passenger of the vehicle sees one display screen, the passenger can confirm the driver mirror images corresponding to the left side mirror, the right side mirror and the rear view mirror at the same time. Thus, even when the driver confirms multiple images reflected on multiple in-vehicle mirrors, it is not necessary for the passenger to move the view point from one in-vehicle mirror to another in-vehicle mirror. The passenger can easily confirm the view of the rear side of the vehicle.

In the fifth and sixth display modes, the left side mirror conversion image, the right side mirror conversion image and the rear view mirror conversion image are arranged on the same display screen so as to match the positioning relationship among the left side mirror, the right side mirror and the rear view mirror. Accordingly, the passenger can easily confirm that each of the mirror conversion images displayed on the same screen corresponds to a respective in-vehicle mirror attached to the vehicle.

In the second display mode, the left and right markers RDL, RDR show the regions around the vehicle, which correspond to the images reflected on the left and right side mirrors, i.e., which correspond to the left side mirror conversion image and the right side mirror conversion image, respectively. Accordingly, the passenger of the vehicle can easily recognize the regions around the vehicle, which correspond to the images reflected on the left and right side mirrors, respectively.

The slant angle of each in-vehicle mirror is adjustable, and the mirror angle sensor 22 detects the slant angle of the in-vehicle mirror. The mirror conversion image is generated in step S170 by converting the coordinates based on the slant angle detected by the sensor 22. Accordingly, the image of the in-vehicle mirror having the slant angle seeing from the view point of the driver is displayed in association with the slant angle of the in-vehicle mirror.

In the eighth display mode, the image shot by the rear camera 12 is displayed on the same screen as the mirror conversion image in steps S90 and S110. Accordingly, when the passenger of the vehicle sees one display screen, the passenger can confirm both of the image corresponding to the in-vehicle mirror and the shot image of the rear camera 12 at the same time.

In the eighth display mode, the reversed image of the image shot by the rear camera 12 is generated such that the right side of the shot image is reversed to the left side, and the left side of the shot image is reversed to the right side. This reversed image is displayed on the same display screen as the mirror conversion image in step S110. Accordingly, when the reversed image of the rear camera 12 is displayed, the right side of the reversed image coincides with a right side of the passenger, and the left side of the reversed image coincides with a left side of the passenger.

In the first to third, sixth to seventh and tenth to eleventh display modes, the top view image is generated with using the shot image of the in-vehicle camera 2. The top view image provides the overhead view of the vehicle and around the vehicle. The top view image is displayed in the same screen as the mirror conversion image. Accordingly, when the passenger of the vehicle sees one display screen, the passenger can recognize both the image corresponding to the in-vehicle mirror and the top view image simultaneously.

The display system 1 provides a display apparatus for a vehicle. The in-vehicle camera 2 provides a shooting element. Steps S50, S90 and S130 provide the shooting element. The image processor 4 and step S170 provides an image conversion element. The left side mirror, the right side mirror and the rear view mirror provide an in-vehicle mirror. The display device 5 provides a display element, and steps S70, S110 and S190 provide the display element. The mirror angle sensor 22 provides a mirror angle detection element. The image processor 4 and step S100 provides a left-right reverse image generation element. Step S60 provides an overhead image generation element.

The front side, the rear side, the right side and the left side of the vehicle provide a predetermined shooting area. The driver is a passenger of the vehicle.

Second Embodiment

In the display system 1 according to a second embodiment, the construction of the system 1 and the periphery image display process are different from the first embodiment.

Figure 9:
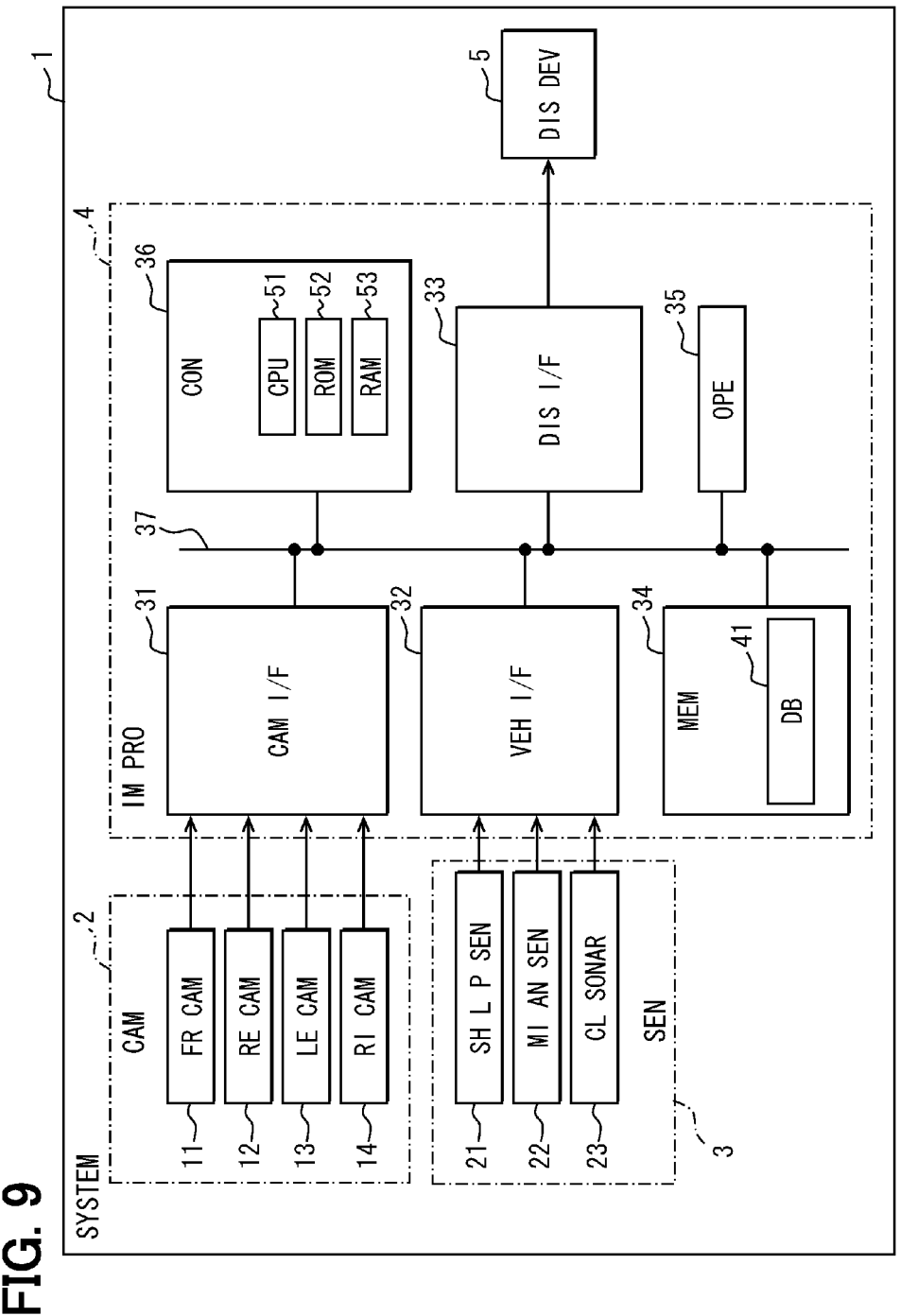
FIG. 9 is a block diagram showing a display system for a vehicle according to a second embodiment.

FIG. 9 shows the display system 1 according to the second embodiment.

The system 1 includes a clearance sonar 23 in the sensors 3. The sonar 23 transmits an ultrasonic wave as a detection wave and receives a reflected wave reflected on an object so that the sonar 23 detects existence of the object and a distance from the vehicle to the object.

Figure 10:
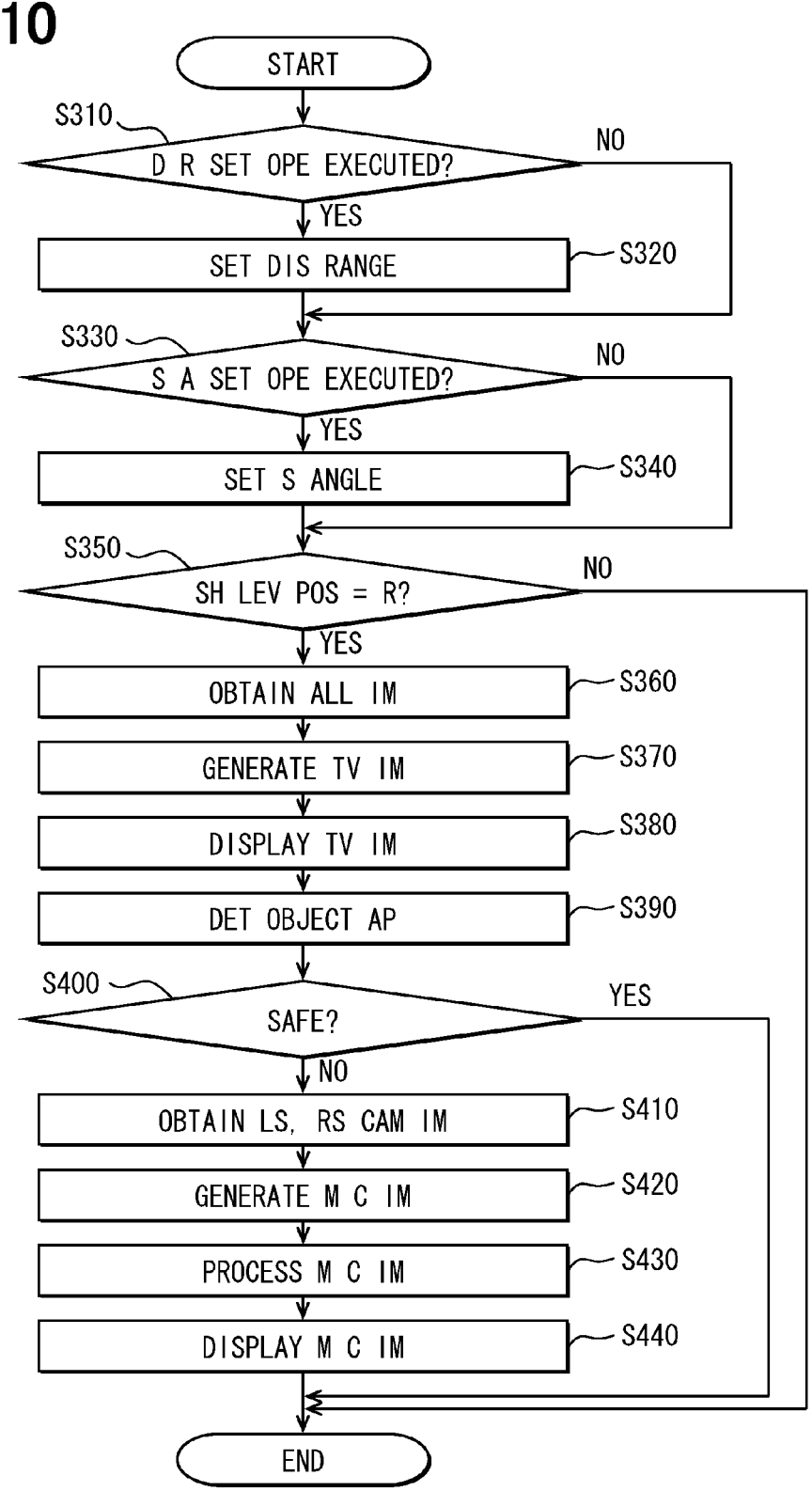
FIG. 10 is a flowchart showing a periphery image display process according to the second embodiment.

A periphery image display process according to the second embodiment will be explained with reference to FIG. 10. FIG. 10 is a flowchart of the periphery image display process.

When the system 1 executes the periphery image display process, the CPU 51 determines in step S310 whether operation for setting a display range of the side mirror image is performed via the operation element 35. Here, the operation for setting the display range is defined as a display range setting operation. When the CPU 51 determines in step S310 that the operation for setting the display range of the display device 5 is not performed, i.e., when the determination in step S310 is "NO," it goes to step S330. When the CPU 51 determines in step S310 that the operation for setting the display range of the display device 5 is performed, i.e., when the determination in step S310 is "YES," it goes to step S320. In step S320, the CPU 51 sets the display range, which is set by the display range setting operation, and then, it goes to step S330.

In step S330, the CPU 51 determines whether operation for setting a slant angle of each of the right and left side mirrors is performed via the operation element 35. Here, the operation for setting the slant angle is defined as a slant angle setting operation. When the CPU 51 determines that the slant angle setting operation is not performed, i.e., when the determination of step S330 is "NO," it goes to step S350. When the CPU 51 determines that the slant angle setting operation is performed, i.e., when the determination of step S330 is "YES," it goes to step S340. In step S340, the CPU 51 sets the slant angle, which is set by the slant angle setting operation, and then, it goes to step S350.

In step S350, based on a signal from the shift lever position sensor 21, the CPU 51 determines whether the position of the shift lever of the vehicle is a reverse position (i.e., "R" position). When the position of the shift lever is not the reverse position of "R," i.e., when the determination of step S350 is "NO," the periphery image display process temporary ends. When the position of the shift lever is the reverse position of "R," i.e., when the determination of step S350 is "YES," it goes to step S360. In step S360, the shot images are obtained from the front camera 11, the rear camera 12, the left side camera 13 and the right side camera 14.

In step S370, the top view image is generated based on the shot images in step S360. Specifically, coordinates of each of four shot images obtained from the front camera 11, the rear camera 12, the left side camera 13 and the right side camera 14 are converted with using the first view point conversion map M1 stored in the view point conversion map database 41. Then, four converted images are combined by connecting overlapped portions of the four converted images so that the top view image is generated. The top view image provides an overhead view showing the vehicle and a surrounding area of the vehicle. In step S380, the top view image generated in step S370 is displayed on the display device 5.

In step S390, based on the detection result of the clearance sonar 23, the CPU 51 determines whether the vehicle approaches the object, and further determines a degree of risk of the approach.

Figure 11A:
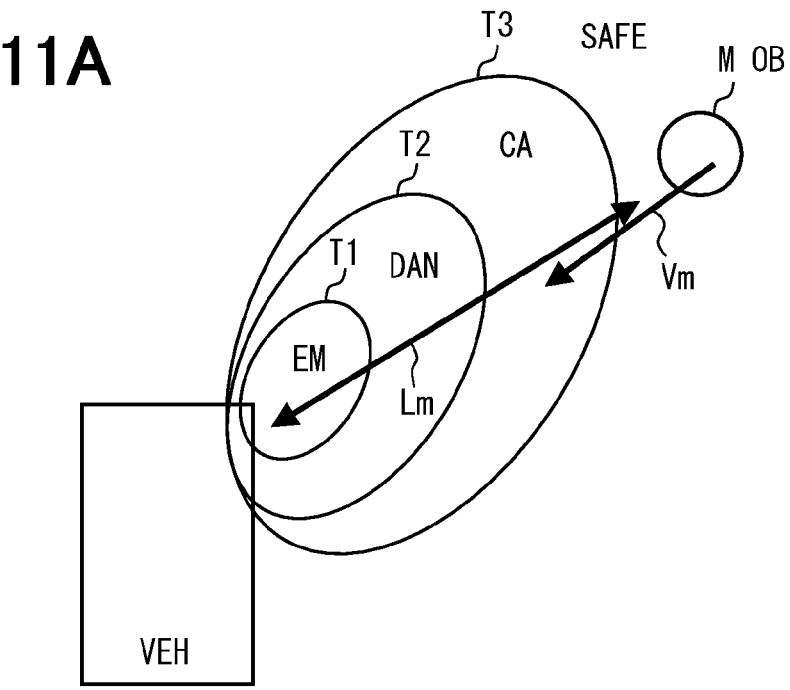
FIGS. 11A and 11B are diagrams showing a method for determining approach of an object.

Specifically, when the object is a moving object, as shown in FIG. 11A, the CPU 51 calculates a time when the object reaches the vehicle based on a relative speed Vm of the object with reference to the vehicle and the distance Lm between the vehicle and the object. Here, the time is an arrival time of the object. The relative speed of the object is defined by an approaching speed of the object toward the vehicle. Based on the arrival time, the CPU 51 determines the degree of risk, which is classed as four types of "emergency," "danger," "caution" and "safe." Specifically, when the arrival time is shorter than a first determination time T1 as a first threshold arrival time such as one second, the CPU 51 determines that the degree of risk is an emergency class. When the arrival time is equal to or longer than the first determination time T1 and shorter than a second determination time T2 as a second threshold arrival time such as three seconds, the CPU 51 determines that the degree of risk is a danger class. When the arrival time is equal to or longer than the second determination time T2 and shorter than a third determination time T3 as a third threshold arrival time such as five seconds, the CPU 51 determines that the degree of risk is a caution class. When the arrival time is equal to or longer than the third determination time T3, or when the object moves away from the vehicle, the CPU 51 determines that the degree of risk is a safe class.

Figure 11B:
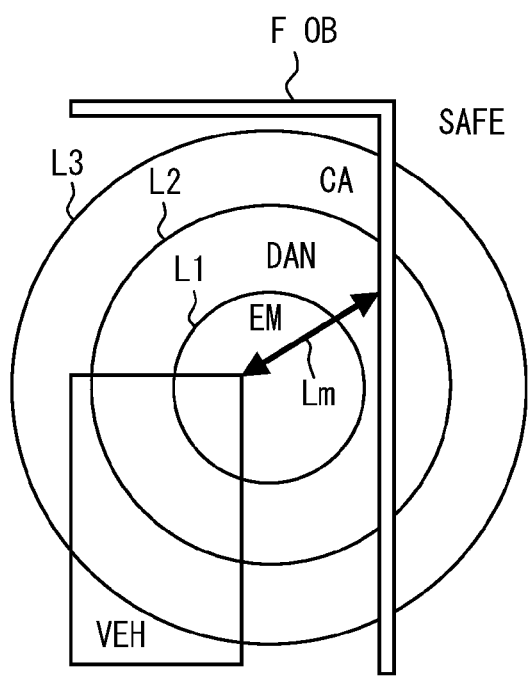

When the object is a fixed object, as shown in FIG. 11B, the CPU 51 determines the degree of risk based on the distance Lm between the vehicle and the fixed object. The degree of risk is classified into four types of "emergency," "danger," "caution" and "safe." Specifically, when the vehicle approaches the object, and further, the distance Lm is smaller than a first determination distance L1 as a first threshold distance such as one meter, the CPU 51 determines that the degree of risk is the emergency class. When the distance Lm is equal to or longer than the first determination distance L1 and smaller than a second determination distance L2 as a second threshold distance such as three meters, the CPU 51 determines that the degree of risk is the danger class. When the distance Lm is equal to or longer than the second determination distance L2 and smaller than a third determination distance L3 as a third threshold distance such as five meters, the CPU 51 determines that the degree of risk is the caution class. When the distance Lm is equal to or longer than the third determination distance L3, or when the object moves away from the vehicle, the CPU 51 determines that the degree of risk is a safe class.

In step S400, the CPU 51 determines whether the degree of risk is the safe class. When the degree of risk is the safe class, i.e., when the determination of step S400 is "YES," the periphery image display process temporary ends.

When the degree of risk is not the safe class, i.e., when the determination of step S400 is "NO," it goes to step S410. In step S410, the shot images are obtained from the left side camera 13 and the right side camera 14. In step S420, a converted image of the left side mirror seeing from the driver (i.e., a left side mirror conversion image) and a converted image of the right side mirror seeing from the driver (i.e., a right side mirror conversion image) are generated according to the shot images in step S410. Specifically, coordinates of the shot image obtained from the left side camera 13 are converted with using the second view point conversion map M2 stored in the view point conversion map database 41 based on the slant angle set in step S340. Thus, the left side mirror conversion image is changed according to the slant angle of the left side mirror. Further, coordinates of the shot image obtained from the right side camera 14 are converted with using the third view point conversion map M3 stored in the view point conversion map database 41 based on the slant angle set in step S340. Thus, the right side mirror conversion image is changed according to the slant angle of the right side mirror.

Then, in step S430, the left side mirror conversion image and the right side mirror conversion image are processed according to the degree of risk determined in step S390 and the display range set in step S320, as shown in FIGS. 12A to 12F.

Figure 12A:
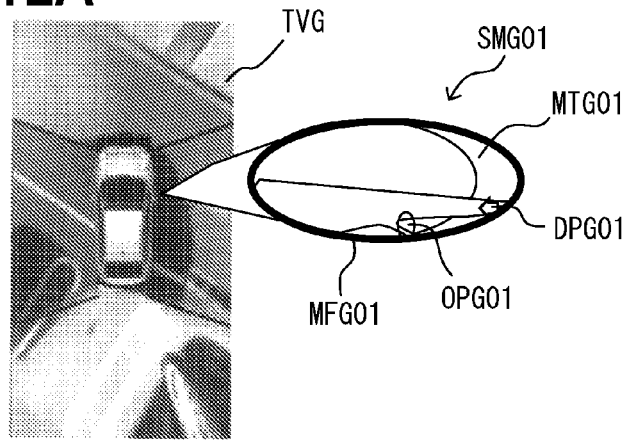
FIGS. 12A to 12C are photographs showing three images of a display mode.

Specifically, according to the display range set in step S320, the left side mirror conversion image and the right side mirror conversion image generated in step S420 are retrieved, and then, the retrieved images are inserted in the mirror frame image. Thus, in some cases, the display range of the mirror conversion image may be different from the actual image reflected on the side mirror. After that, when the CPU 51 determines in step S390 that the degree of risk is the caution class, as shown in FIGS. 12A and 12D, the left side mirror conversion image and the right side mirror conversion image are processed in such a manner that the side mirror image SMG01 is displayed adjacent to the top view image TVG. In FIGS. 12A and 12D, only the right side mirror image SMG01 is shown. However, the left side mirror image may be displayed adjacent to the top view image TVG. The side mirror image SMG01 includes a mirror frame image MFG01, a mirror conversion image MTG01, an object indication image OPG01 and a direction indication image DPG01. The mirror frame image MFG01 shows a frame of the side mirror. The mirror conversion image MTG01 is displayed in the mirror frame image MFG01. The object indication image OPG01 shows the object, which approaches the vehicle. The direction indication image DPG01 shows a direction, to which the object moves. Here, the object indication image OPG01 and the direction indication image DPG01 are displayed on the mirror conversion image TMG01.

Figure 12B:
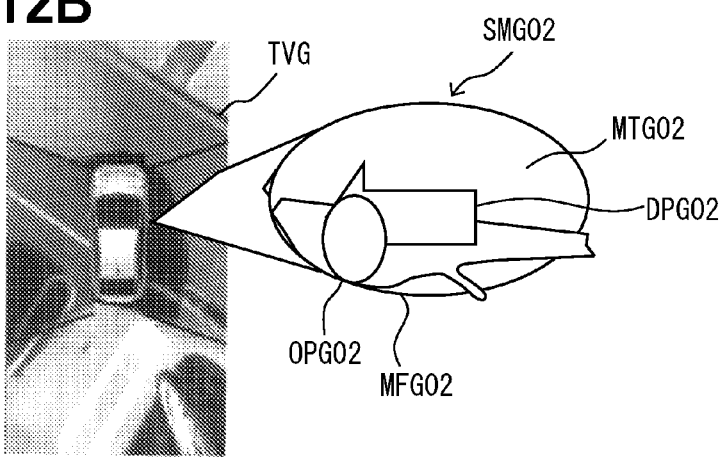
Figure 12C:
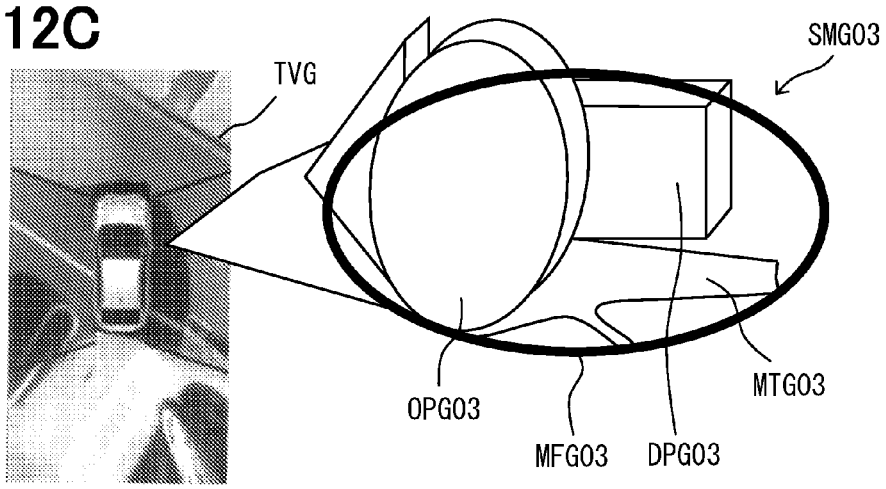
Figure 12D:
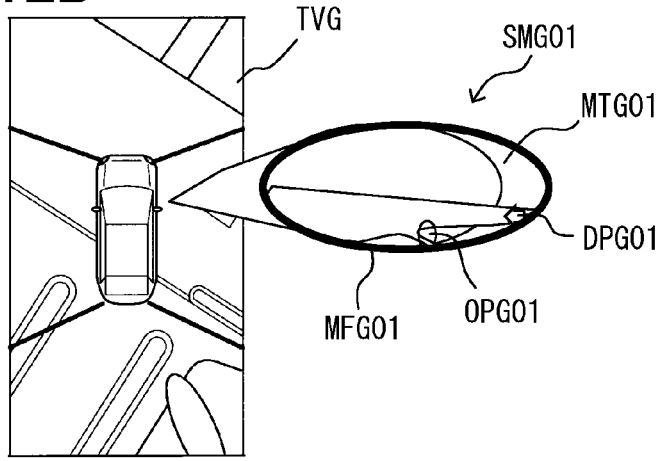
FIGS. 12D to 12F are illustrative diagrams corresponding to FIGS. 12A to 12C, respectively.
Figure 12E:
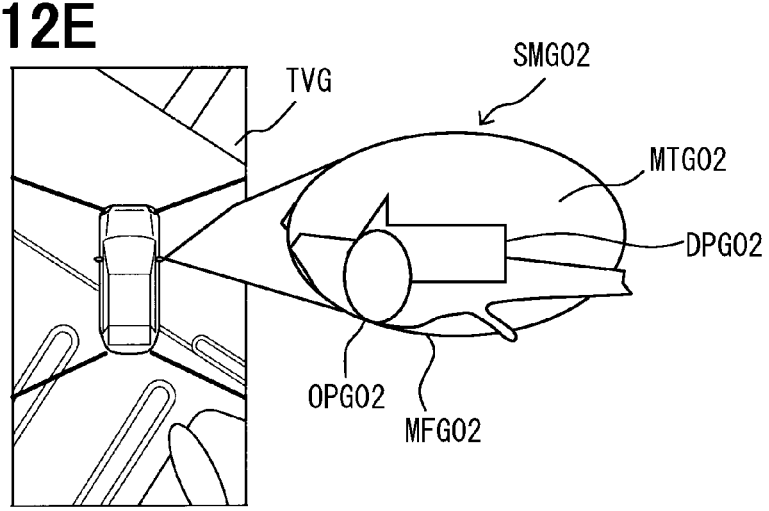
Figure 12F:
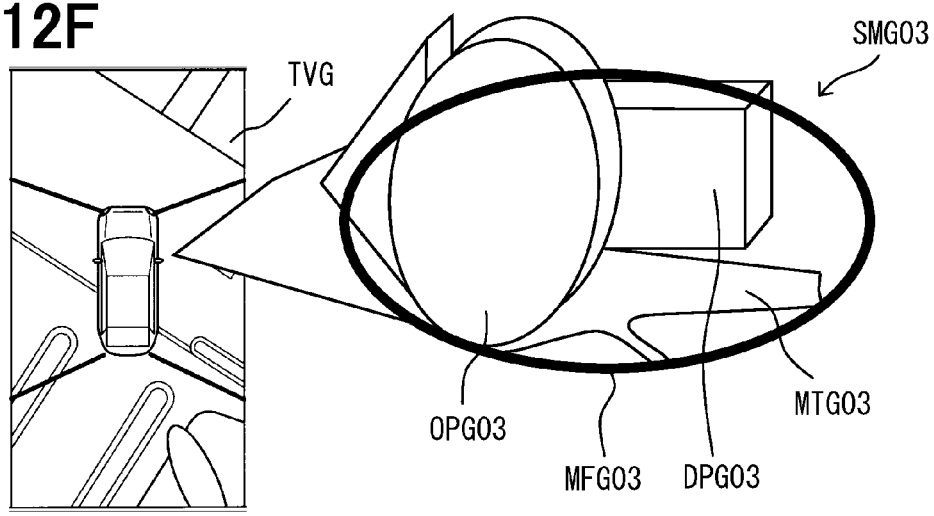

When the CPU 51 determines in step S390 that the degree of risk is the danger class, as shown in FIGS. 12B and 12F, the left side mirror conversion image and the right side mirror conversion image are processed in such a manner that the side mirror image SMG02 is displayed adjacent to the top view image TVG. In FIGS. 12B and 12D, only the right side mirror image SMG02 is shown. However, the left side mirror image may be displayed adjacent to the top view image TVG. The side mirror image SMG02 includes a mirror frame image MFG02, a mirror conversion image MTG02, an object indication image OPG02 and a direction indication image DPG02. The side mirror image SMG02 is displayed to have dimensions larger than the mirror frame image MFG01 and to have color stronger than the mirror frame image MFG01. Further, the object indication image OPG02 and the direction indication image DPG02 in the mirror conversion image MTG02 are larger than the object indication image OPG01 and the direction indication image DPG01 in the mirror conversion image MTG01.

When the CPU 51 determines in step S390 that the degree of risk is the emergency class, as shown in FIGS. 12C and 12F, the left side mirror conversion image and the right side mirror conversion image are processed in such a manner that the side mirror image SMG03 is displayed adjacent to the top view image TVG. In FIGS. 12C and 12F, only the right side mirror image SMG03 is shown. However, the left side mirror image may be displayed adjacent to the top view image TVG. The side mirror image SMG03 includes a mirror frame image MFG03, a mirror conversion image MTG03, an object indication image OPG03 and a direction indication image DPG03. The side mirror image SMG03 is displayed to have dimensions larger than the mirror frame image MFG02. Further, the object indication image OPG03 and the direction indication image DPG03 in the mirror conversion image MTG03 are larger than the object indication image OPG02 and the direction indication image DPG02 in the mirror conversion image MTG02. Furthermore, the object indication images OPG01, OPG02 and the direction indication images DPG01, DPG02 are displayed on the plane. However, the object indication image OPG03 and the direction indication image DPG03 are displayed three-dimensionally.

After step S430, it goes to step S440. In step S440, the image generated in step S430 is displayed on the display device 5, and then, the periphery image display process temporary ends.

In the system 1, when the display range setting operation for setting the display range of the side mirror image is performed, the display screen is set according to the display range instructed by the display range setting operation in step S310, S320. Accordingly, the operation of the passenger of the vehicle provides to change the display range of the mirror conversion image.

When the slant angle setting operation for setting the slant angles of the left and right side mirrors is performed, the display screen is set according to the slant angle instructed by the slant angle setting operation in step S330, S340. The actual slant angles of the left and right side mirrors are estimated as the setting slant angle, and the images reflected on the left and right side mirrors that are viewed by the driver are generated in step S420 by converting the coordinates of the shot images obtained from the left and right side cameras 13, 14. Accordingly, regarding the in-vehicle mirror image recognized by the driver when the actual slant angles of the left and right side mirrors are estimated as the setting slant angle, the slant angle of the in-vehicle mirror is changed by the operation of the passenger in the vehicle.

The object approaching the vehicle is detected by the clearance sonar 23 in step S390. When the object is detected, the mirror conversion image is displayed in step S400, S440. Accordingly, when the object approaches the vehicle, the mirror conversion image is automatically displayed. Thus, the passenger can recognize according to the display screen of the mirror conversion image that the object approaches the vehicle.

Step S420 provides an image conversion element. Step S440 provides a display element. The operation element 35 and steps S310, S320 provide a first setting element, and the operation element 35 and steps S330, S340 provide a second setting element. The clearance sonar 23 and step S390 provide an object approach detection element. The display range setting operation provides a first external operation, and the slant angle setting operation provides a second external operation.

Third Embodiment

A display system for a vehicle according to a third embodiment has a construction and a periphery image display process, which are different from the second embodiment.

Figure 13:
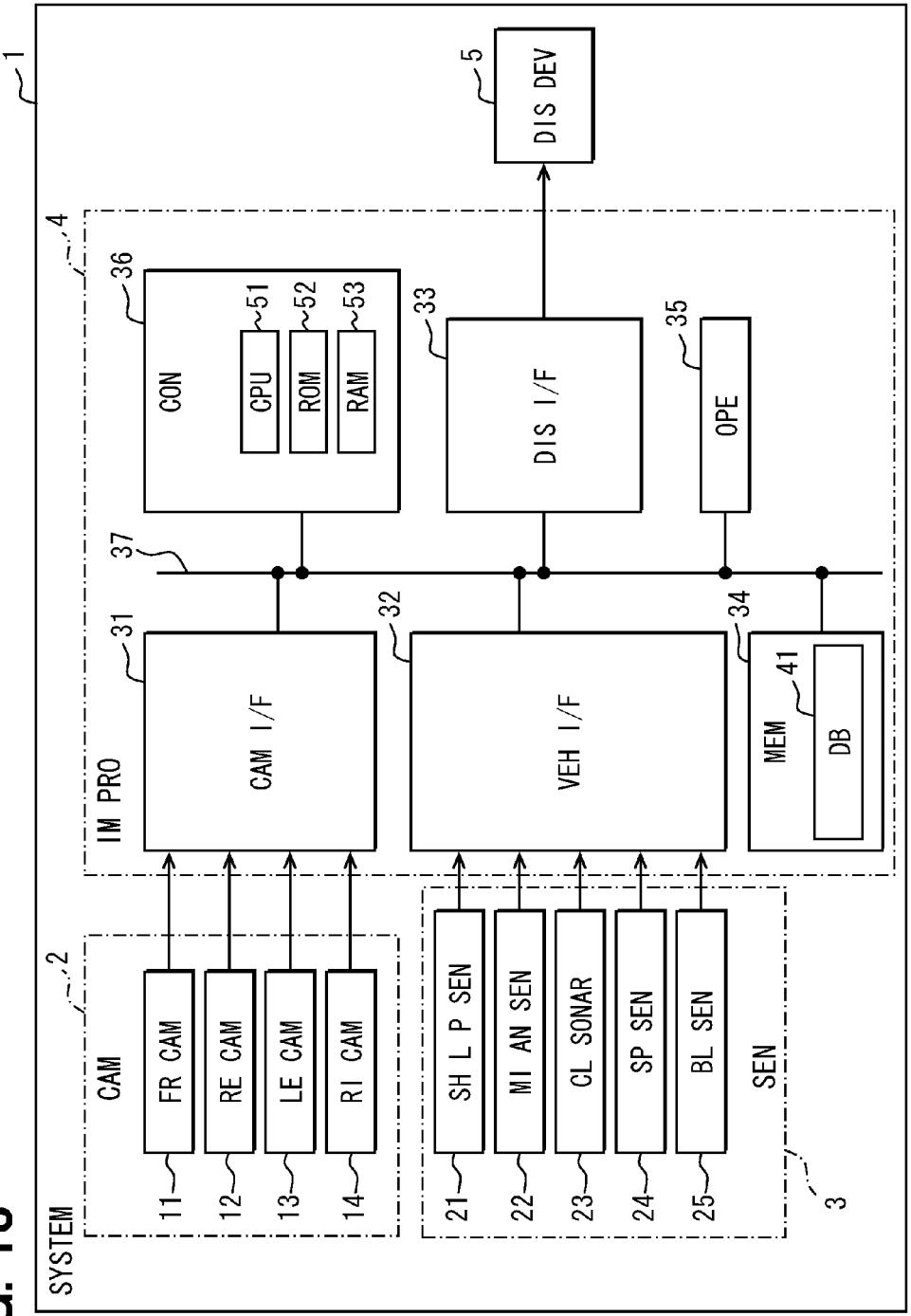
FIG. 13 is a block diagram showing a display system for a vehicle according to a third embodiment.

FIG. 13 shows the system 1 according to the third embodiment.

The system 1 includes a vehicle speed sensor 24 for detecting a driving speed of the vehicle and a blinker sensor 25 for detecting operation status of a blinker of the vehicle. Specifically, the blinker sensor 25 detects turn-on and off of the blinker.

Figure 14:
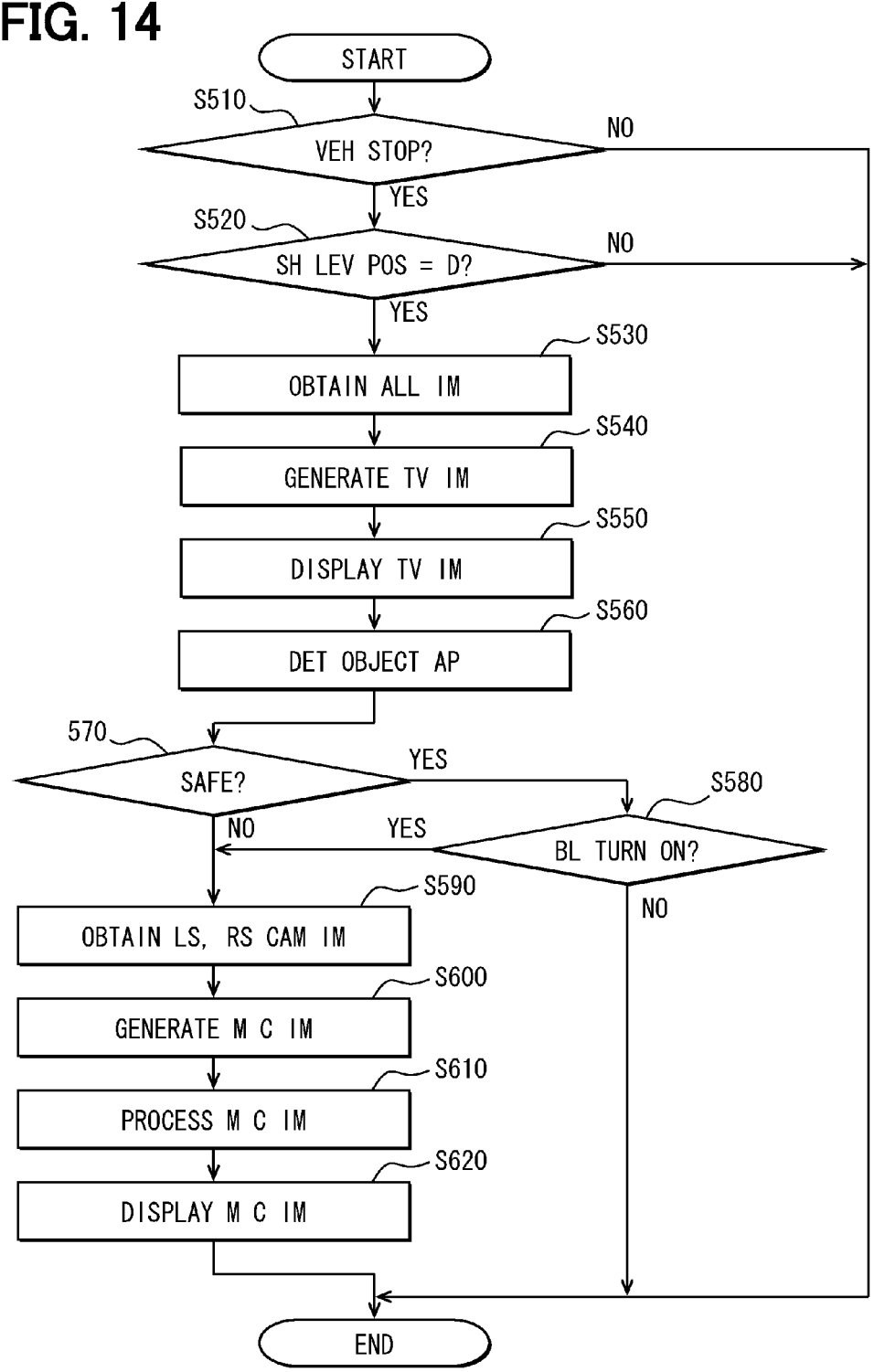
FIG. 14 is a flowchart showing a periphery image display process according to the third embodiment.

The periphery image display process is shown in FIG. 14.

When the periphery image display process is executed, the CPU 51 determines in step S510 based on the detection result of the speed sensor 24 whether the vehicle having the system 1 stops. When the vehicle does not stop, i.e., when the determination in step S510 is "NO," the periphery image display process temporary ends. When the vehicle stops, i.e., when the determination in step S510 is "YES," it goes to step S520. In step S520, based on the signal from the shift lever position sensor 21, the CPU 51 determines whether the position of the shift lever is a driving position (i.e., "D" position).

When the position of the shift lever is not the driving position, i.e., when the determination in step S520 is "NO," the periphery image display process temporary ends. When the position of the shift lever is the driving position, i.e., when the determination in step S520 is "YES," it goes to step S530. In step S530, the shot images are obtained from the front camera 11, the rear camera 12, the left side camera 13 and the right side camera 14.

In step S540, the top view image is generated based on the shot images in step S530. Further, in step S550, the top view image in step S540 is displayed in the display device 5.

After that, in step S560, based on the detection result of the clearance sonar 23, the CPU 51 determines whether the vehicle approaches the object, and further determines a degree of risk of the approach. Further, in step S570, the CPU 51 determines whether the degree of risk is the safe class. When the CPU 51 determines that the degree of risk is the safe class, i.e., when the determination of step S570 is "YES," it goes to step S580. In step S580, the CPU 51 determines based on the detection result of the blinker sensor 25 whether the blinker turns on.

Here, when the blinker turns off, i.e., when the determination of step S580 is "NO," the periphery image display process temporally ends. When the blinker turns on, i.e., when the determination of step S580 is "YES," it goes to step S590. Further, when the CPU 51 determines in step S570 that the degree of risk is not the safe class, i.e., when the determination of step S270 is "NO," it goes to step S590.

In step S590, the shot images are obtained from the left and right side cameras 13, 14. In step S600, the left side mirror conversion image and the right side mirror conversion image are generated according to the shot images in step S590.

In step S610, the left and right side mirror conversion images are processed according to the degree of risk in step S560. In step S620, the processed image in step S610 is displayed on the display device 5. Then, the periphery image display process temporary ends.

Figure 15:
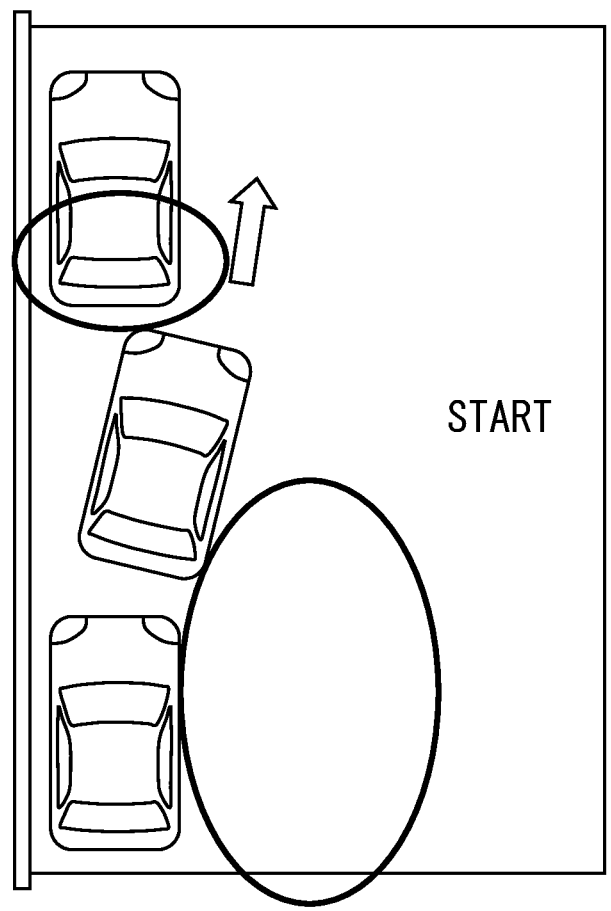
FIG. 15 is a diagram showing a start of the vehicle from a parallel parking state.

Thus, in the system 1, the speed sensor 24 detects the speed of the vehicle, and the shift lever position sensor 21 detects the position of the shift lever. Further, the blinker sensor 25 detects the operation of the blinker of the vehicle. When the CPU 51 determines based on the detection results of the vehicle speed sensor 24, the shift lever position sensor 24 and the blinker sensor 25 that the vehicle stops, the shift lever position is the driving position, and the blinker turns on, the mirror conversion image is displayed in steps S510, S520, S580, S620. Accordingly, as shown in FIG. 15, in a situation that it is necessary for the driver to view the rear side of the vehicle when the driver starts running the vehicle to enter a driving lane from a parking lot, the system 1 displays automatically the image reflected on the in-vehicle mirror without operation and instruction of the passenger in the vehicle.

Step S600 provides an image conversion element. Step S620 provides a display element. The vehicle speed sensor 24 provides a vehicle speed detection element. The shift lever position sensor 21 provides a shift lever position detection element. The blinker sensor 25 provides a blinker operation detection element.

In the above embodiments, the image reflected on the in-vehicle mirror viewed from the driver is displayed. Alternatively, an image reflected on the in-vehicle mirror viewed from another passenger in the vehicle who sits down on a seat other than the driver seat may be displayed.

Figure 16A:
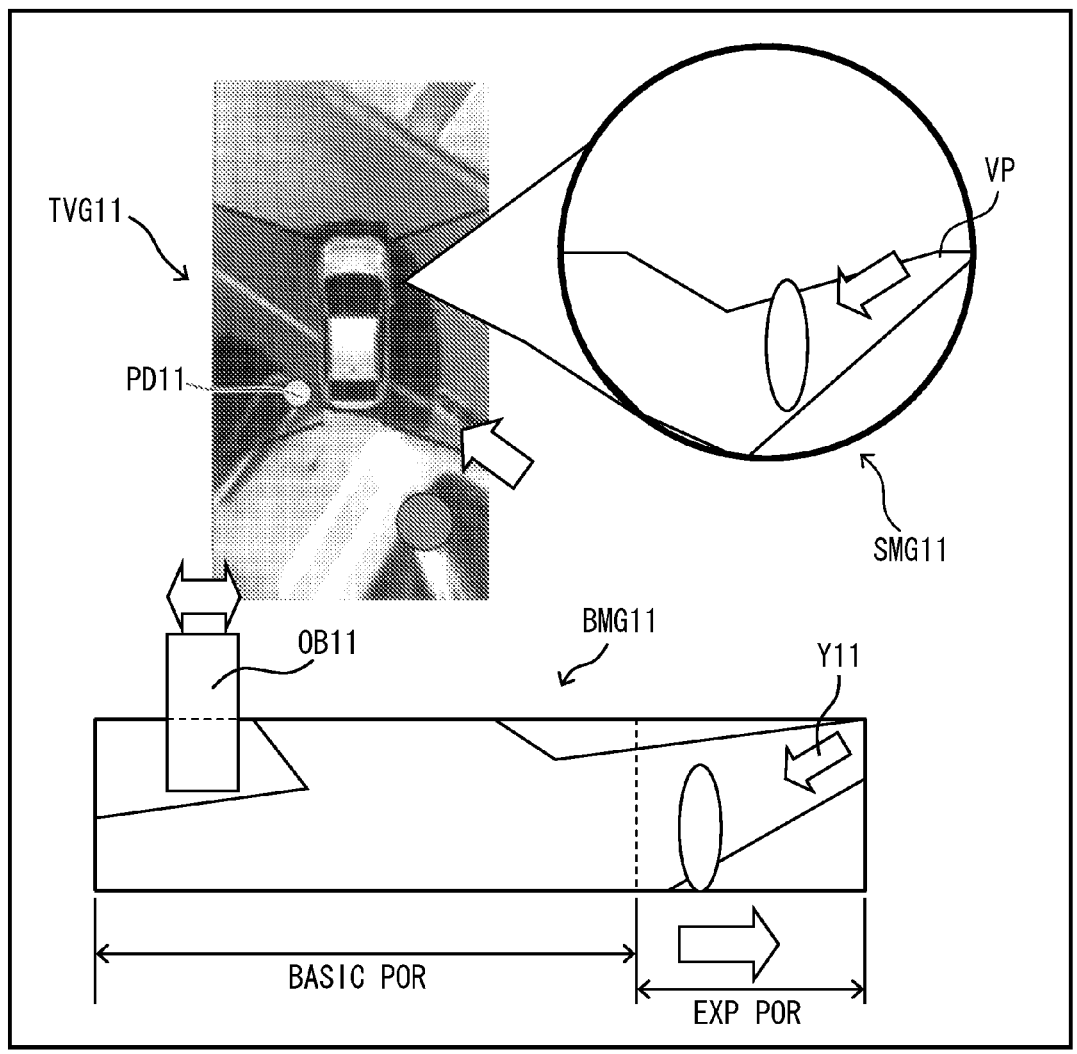
FIG. 16A is a photograph showing a display mode according to other embodiments.
Figure 16B:
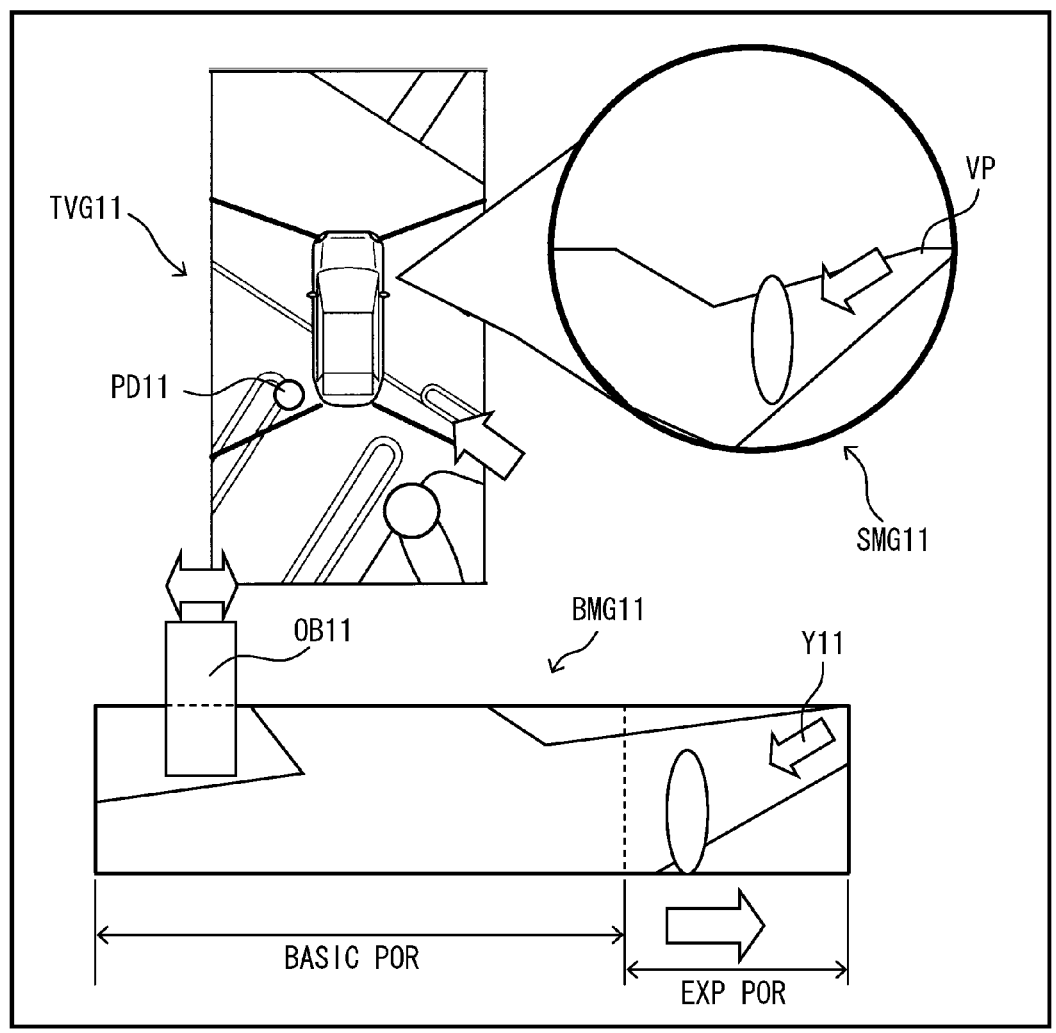
FIG. 16B is a illustrative diagram corresponding to FIG. 16A.

As shown in a side mirror image SMG11 in FIGS. 16A and 16B, a vanishing point VP of a road may be displayed, so that an object disposed far from the vehicle is displayed. Further, a color of a highlight of the image may be changed according to the approaching speed of the object. Alternatively, the moving speed of the object may be shown in a motion blur manner.

Alternatively, even when the vehicle moves, the background of the image reflected on the side mirror may be fixed. In this case, the moving speed of the object can be recognized by the user intuitively. Further, supplemental information such as a distance to the object may be displayed in the side mirror image SMG11 so as to recognize the position of the object for the driver.

As shown in the rear view mirror image BMG11 in FIG. 16A and 16B, a display range may be expanded so as to display the approaching object. In case of FIGS. 16A and 16B, the object approaches the vehicle from the right side of the vehicle. Specifically, the object approaches the vehicle from the right side of the display range in the rear view mirror image BMG11. This is shown as an arrow Y11. Thus, the display range is expanded to the right side of the range. Specifically, a basic portion of the image BMG11 is expanded to have an expanded portion.

As shown in the rear view mirror image BMG11 in FIG. 16A and 16B, when a land mark object OB11 for parking the vehicle is disposed near the vehicle, the land mark object OB11 may be displayed three dimensionally and/or to have strong color, and/or to protrude from the rear view mirror image BMG11 so that the driver can recognize the land mark object OB11 easily. When the three dimensionally highlighted display is performed, the three dimensional coordinates are retrieved from the shot image, and material of a surface of the object is shown as a texture of the image, so that a virtual reality image is generated and recorded. Then, the land mark object OB11 is displayed according to the moving position of the vehicle so as to be utilized by the driver as a parking mark. Thus, even when it is in a midnight or it is rain, the driver can recognize the land mark object OB11 clearly so that the driver parks the vehicle safety. Specifically, the system 1 clearly displays the land mark object OB11.

As shown in the top view image TVG11 in FIG. 16, when a fixed object such as a pole approaches within a predetermined range, a pole display image PD11 may be displayed in the top view image so as to distinguish the fixed object easily.

Figure 17A:
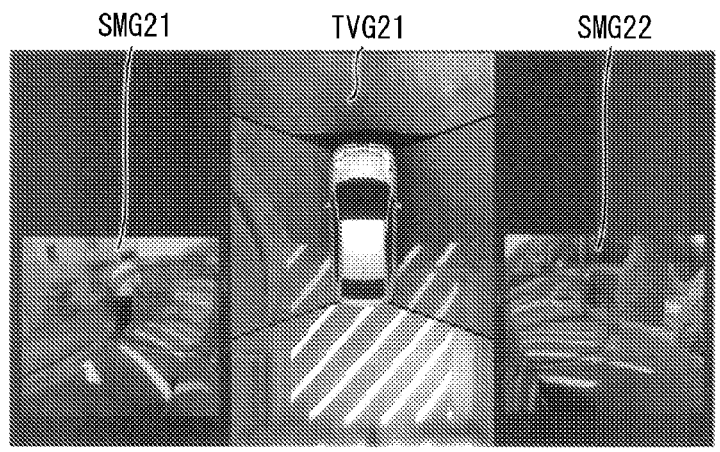
FIGS. 17A to 17C are photographs showing display modes according to other embodiments.
Figure 17B:
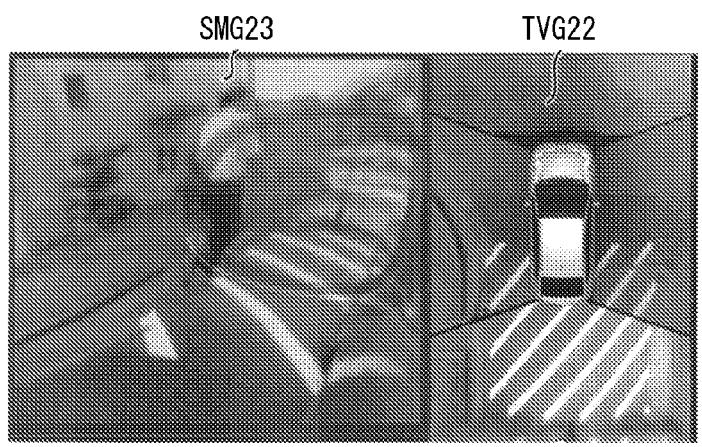
Figure 17C:
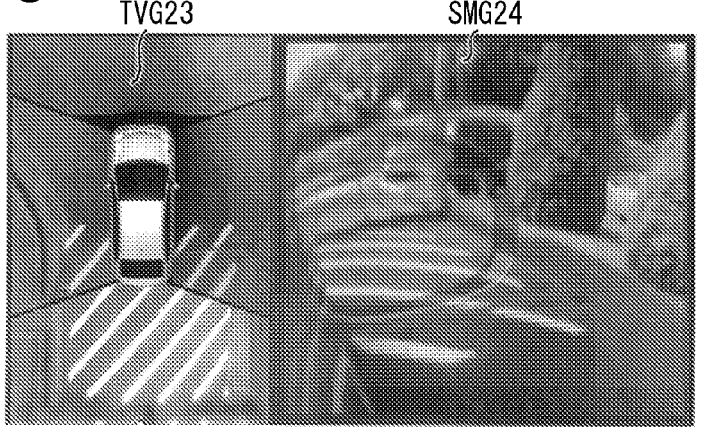
Figure 17D:
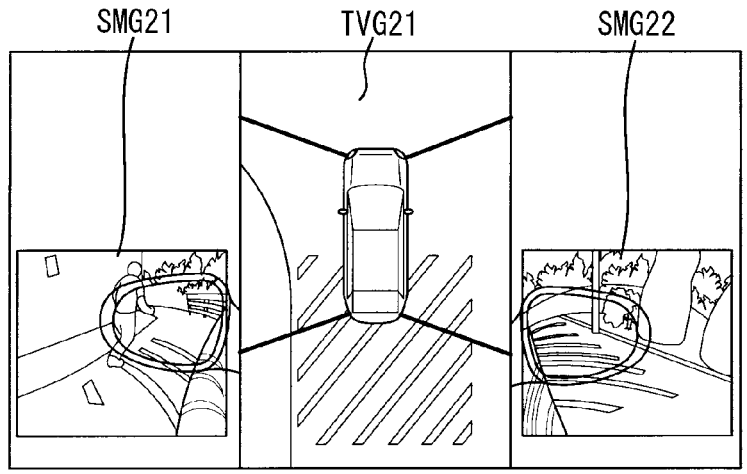
FIGS. 17D to 17F are illustrative diagrams corresponding to FIGS. 17A to 17C, respectively.
Figure 17E:
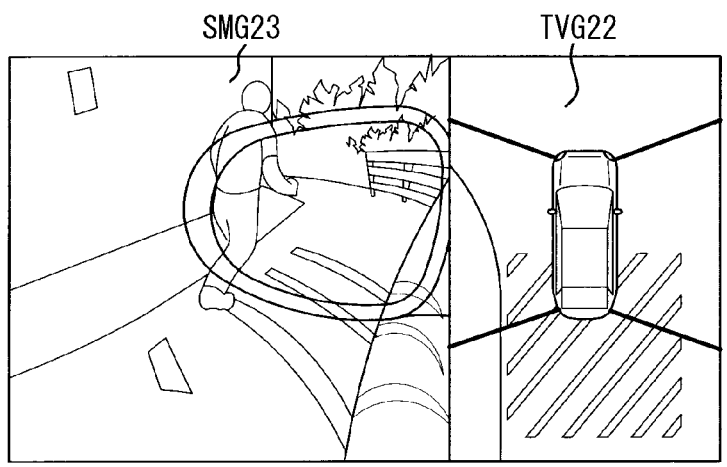
Figure 17F:
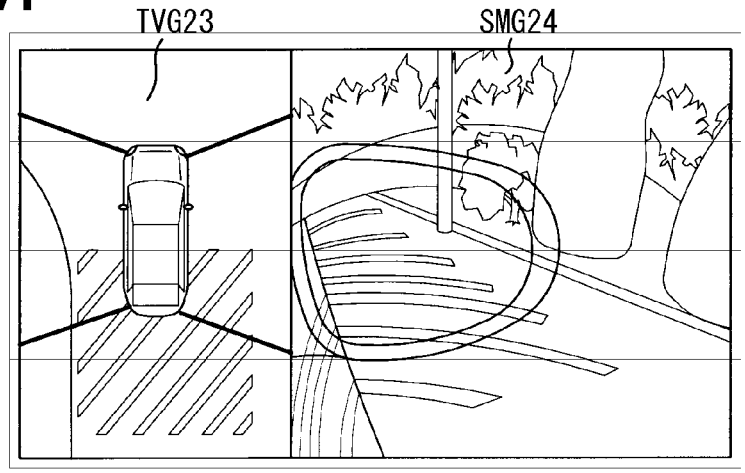

In the above embodiments, when the shift lever position is the reverse position, and the object approaches the vehicle, as shown in FIGS. 17A and 17D, the top view image TVG21, the left side mirror image SMG21, and the right side mirror image SMG22 are displayed. Alternatively, as shown in FIGS. 17B and 17E, when the object approaches the vehicle from the left rear side of the vehicle, the top view image TVG22 and the left side mirror image SMG23 are displayed, and further, the left side mirror image SMG23 may be expanded and displayed. Alternatively, as shown in FIGS. 17C and 17F, when the object approaches the vehicle from the right rear side of the vehicle, the top view image TVG23 and the right side mirror image SMG24 are displayed, and further, the right side mirror image SMG24 may be expanded and displayed.

In the above embodiments, as shown in FIGS. 11A and 11B, based on both of the arrival time that the moving object reaches the vehicle and the distance between the vehicle and the object, the degree of risk is determined. Alternatively, the degree of risk may be determined based on the distance to the object, which is changeable according to the approaching direction of the object. Alternatively, the degree of risk may be determined based on the relative speed of the object and the vehicle and/or the moving direction of the vehicle. Alternatively, the degree of risk may be determined based on an angle between a driving direction of the vehicle and an approaching direction of the object.

Figure 18:
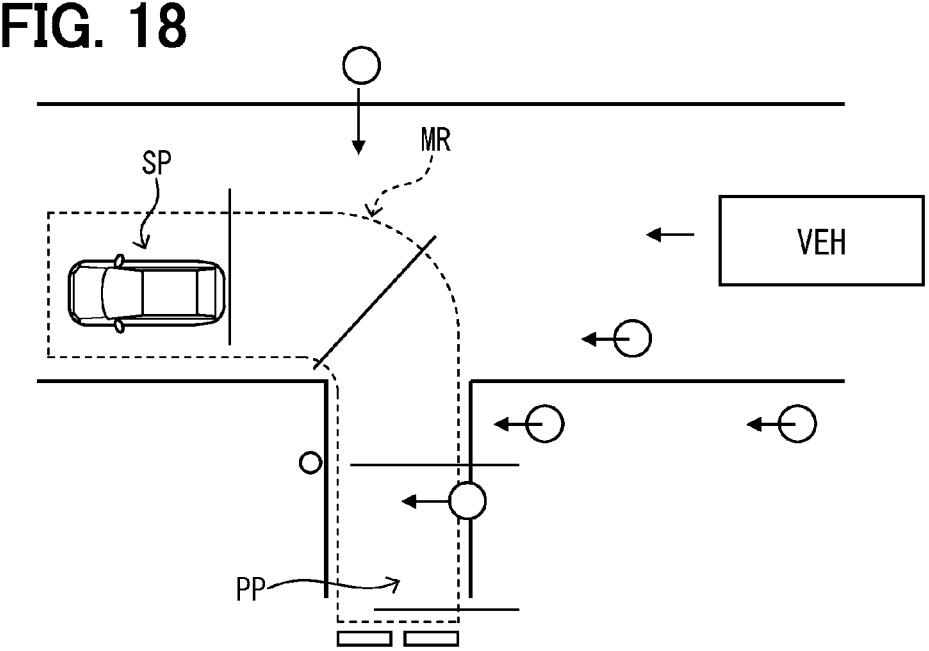
FIG. 18 is a diagram showing a moving range of the vehicle.

Alternatively, the degree of risk may be determined based on the following criteria. Specifically, when the object is already disposed within a moving range MR of the vehicle, the CPU 51 determines that the degree of risk is the emergency class. When the object enters possibly in the moving range MR, the CPU 51 determines that the degree of risk is the danger class. When the object approaches the moving range MR, the CPU 51 determines that the degree of risk is the caution class. When the object does not approach the moving range MR, the CPU 51 determines that the degree of risk is the safe class. Here, as shown in FIG. 18, the moving range MR is obtained by calculation. For example, when the vehicle moves from a stop position SP to a parking position PP, the moving speed of the vehicle is estimated as 0.5 m per seconds, so that the CPU 51 estimates existence of the vehicle in a moving range with time.

Here, the moving range MR may be calculated together with the estimated moving speed of the vehicle, which is changeable according to a driving skill of the driver. For example, the skilled driver can park the vehicle for a short time, so that the moving speed of the vehicle in case of parking is large. Thus, the estimated moving speed may be set to be large, and the moving range MR is calculated with using the large moving speed. Alternatively, according to the estimated moving speed, the timing of notice to the driver in case of the caution, danger and emergency may be changed. Here, the notice is performed by the display of the side mirror image. In this case, the notice timing is not delayed, and the driver can drive the vehicle easily. Further, the system 1 informs the driver of caution, danger and emergency appropriately. so that the noticed does not bother the driver.

Regarding the approach determination of the fixed object, the CPU 51 may determine a physical body having dimension equal to or larger than predetermined dimensions as the object. Alternatively, when the driver always uses a specific fixed body as the land mark object for parking, the fixed body may be displayed even when the fixed body is not disposed within the moving range MR. Accordingly, when the driver parks the vehicle at a parking lot, which the driver utilizes many times, the driver may specify a certain physical body as the land mark object. For example, a parking frame, a tire chock, a sidewall or the like may be displayed so that corresponding images may be used for setting the land mark object.

When the driver parks the vehicle, and the system 1 detects that the object may hit a side of the vehicle, the mirror frame image of the side mirror image on the side of the vehicle is zoomed in and out, and further, a sound notification may be output so that the system 1 informs the passenger in the vehicle of the emergency. For example, when a pedestrian may hit on a left side of the vehicle, the shape of the mirror frame in the left side mirror image is enlarged and reduced, and the sound such as a cracking noise is output.

Alternatively, emergency engine stop or emergency braking operation may be performed for an engine controller or a brake system together with zooming in and out the mirror frame image. In this case, even if the object contacts the vehicle, the vehicle almost stops.

When the object is to contact the side mirror, a motion picture may be displayed such that the side mirror is closed. Thus, the system informs the driver of the contact with the object by displaying the motion picture.

After the driver parks the vehicle, and when the driver opens a door of the vehicle, the door may hit on a fixed object or a moving object. In this case, the system 1 displays an image such that an image of the side mirror is changed to an image of the door, so that the system 1 informs the driver of the caution of contact. Alternatively, when the user opens a trunk door of the vehicle, the trunk door may hit on the object. In this case, the system 1 displays the image for alerting the driver of the contact with the trunk door. For example, the system 1 may display the rear view mirror image in addition to the side mirror image.

Figure 19:
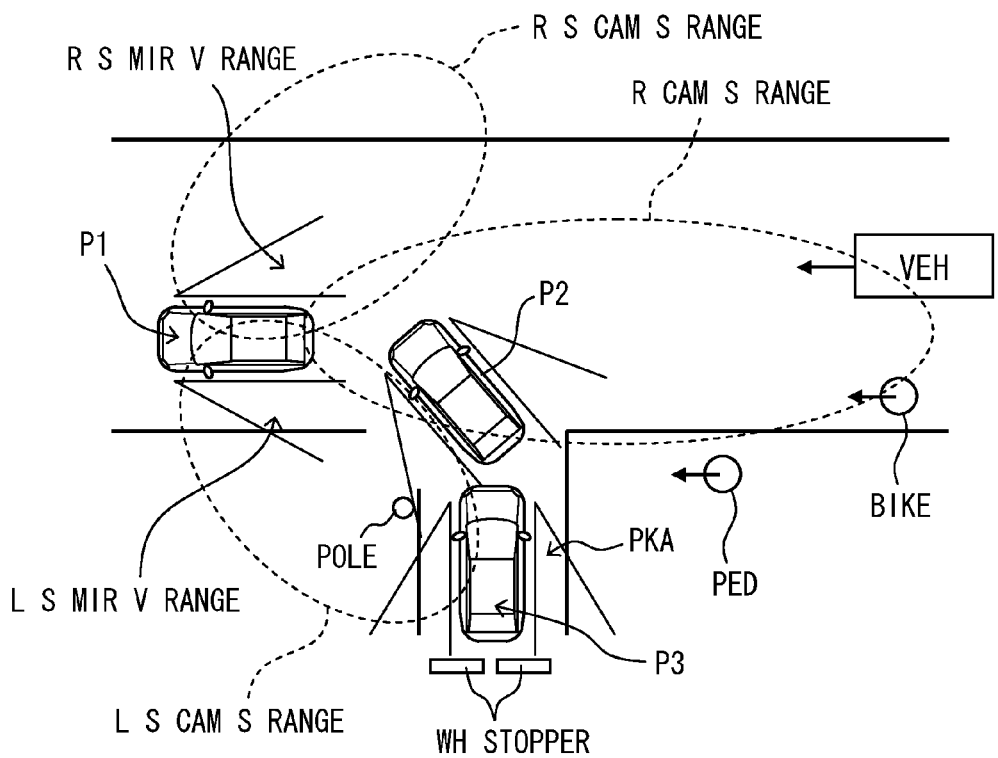
FIG. 19 is a diagram showing a case where a moving object approaches from a rear side of the vehicle when the vehicle starts from a parking state.

As shown in FIG. 19, when the driver parks the vehicle at a parking lot in such a manner that the vehicle is turned by 90 degrees and driven in reverse, and when another vehicle, a bicycle or a pedestrian approaches the vehicle from a rear side of the vehicle, it may be difficult for the driver to recognize an approaching object, and/or it is difficult for the driver to see the image of the approaching object reflected on the side mirror and the rear view mirror. Accordingly, when the object approaches the vehicle, and the object is disposed at a position in a range, in which the driver cannot see the image of the object reflected on the in-vehicle mirror, the side mirror image and the rear view mirror image are generated with using the shot images obtained from the in-vehicle camera 2, so that the side mirror image and the rear view mirror image may be displayed on the display device 5. Thus, the system 1 informs the driver of danger. Here, in FIG. 19, R S MIR V RANGE represents a range to be visible on the right side mirror, and L S MIR V RANGE represents a range to be visible on the left side mirror. R S CAM S RANGE represents a shooting range of the right side camera, and L S CAM S RANGE represents a shooting range of the left side camera. R CAM S RANGE represents a shooting range of the rear camera. VEH represents another vehicle, PED represents a pedestrian, and BIKE represents a bicycle. WH STOPPER represents a wheel stopper for the vehicle.

For example, when the vehicle is disposed at a position P1, and the vehicle stops before the vehicle moves to a parking lot PKA, and the system 1 detects a moving object such as a pedestrian, a bicycle and another vehicle, which approaches the vehicle and moves on a traffic lane behind the vehicle or on a sidewalk, the system 1 displays the left side mirror image, and further, the system 1 may highlight and display the image of the approaching object on the left side mirror image according to the position and the speed of the object.

When the vehicle is disposed at a position P2, and the driver turns the vehicle so as to park the vehicle to the parking lot PKA, the system 1 may display the side mirror image such that an image of a landscape of the moving object such as a road on which the object runs is almost fixed. Specifically, even when the vehicle moves and turns, the system 1 displays the image without being affected by the movement of the vehicle. Thus, the driver can recognize easily the position of the object, the pedestrian and the like on the road and the sidewalk, and further, the driver can recognize easily whether the object, the pedestrian and the like approaches or goes away from the vehicle. Thus, approach position determination is easily performed. Thus, the shot image of the in-vehicle camera 2 may be rotated. Alternatively, when the driver parks the vehicle at the parking lot for the second or more times, the road image, which was shot and stored in the system 1, is used as a fixed image. Further, the system 1 may display the images of the fixed object, the pedestrian and the moving object with overlapping over the fixed image and/or the rotated image. Furthermore, the system 1 may determine a position range of the vehicle with respect to the parking area PKA based on the image and/or the detection result of the sonar. When it is necessary for the driver to modify the drive of the vehicle, the system 1 may display the side mirror image so as to provide caution. For example, the image of the side mirror, on which the vehicle is to contact the object, provides an image of an ear of a human so that the system 1 informs the driver of caution.

When the driver drives the vehicle in reverse to cross the sidewalk for entering into the parking area PKA, the system 1 may display a sign for showing approach of a moving object in addition to the side mirror image if the moving object such as a pedestrian and a bicycle is passing or to pass through the sidewalk. Further, when the pedestrian and the like passes through the park area PKA, the system 1 may display a sign for showing a position of the moving object and a distance between the moving object and the vehicle in addition to the side mirror image on a side, on which the moving object such as the pedestrian and the bicycle is disposed. For example, when the pedestrian approaches the vehicle from a left side of the vehicle, the system 1 may display the sign together with the left side mirror image. Furthermore, when there is danger of collision, the system 1 may output a warning sound so as to inform the danger of collision.

When the vehicle is disposed at a position P3, at which the vehicle is accommodated in the parking area PKA, and there is the wheel stopper at the rear of the vehicle, the system 1 may inform a caution of contact with the wheel stopper. Alternatively, if there is possibility for the vehicle to hit another vehicle that is disposed in another parking area at the rear of the vehicle even when there is the wheel stopper, the system 1 may guide a distance between the vehicle and the other vehicle.

When the vehicle stops in the parking area PKA, the system 1 may detect a distance between the vehicle and another vehicle, which is disposed in another parking area adjacent to (i.e., on the right or left side of) the parking area PKA. Further, the system 1 may display a sign for showing a caution of door opening in addition to the side mirror image according to the detection result of the distance when it is necessary to inform the caution because the vehicle has a certain door opening system. For example, when the vehicle has a slide door opening system, and the passenger opens the door, the door may not contact another vehicle, so that it may be not necessary to display the sign. Alternatively, before the passenger opens the door, the system 1 may output voice guidance for altering the passenger.

Although the system 1 includes the clearance sonar 23 for detecting existence of the object and the distance to the object, the system 1 may detect existence of the object and the distance to the object with using the shot image and/or a laser beam.

Figure 20A:
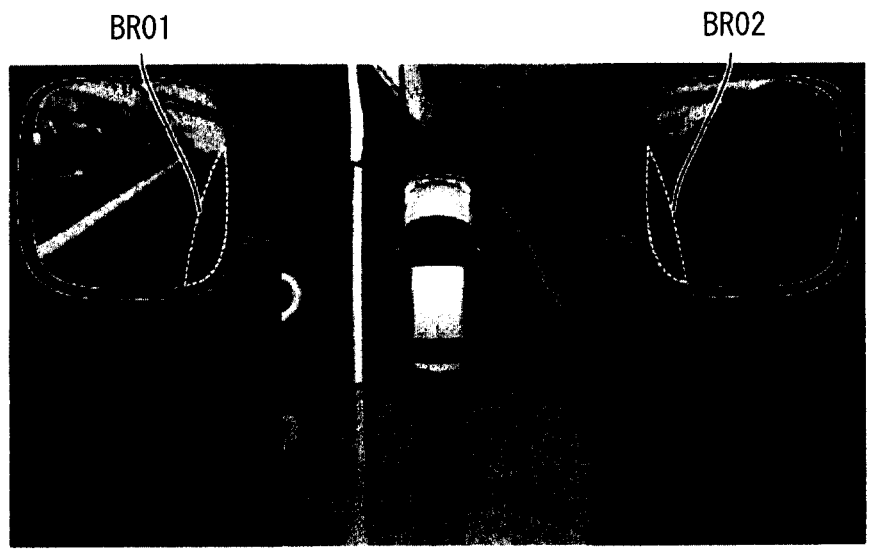
FIG. 20A is a photograph showing a display mode according to other embodiments.
Figure 20B:
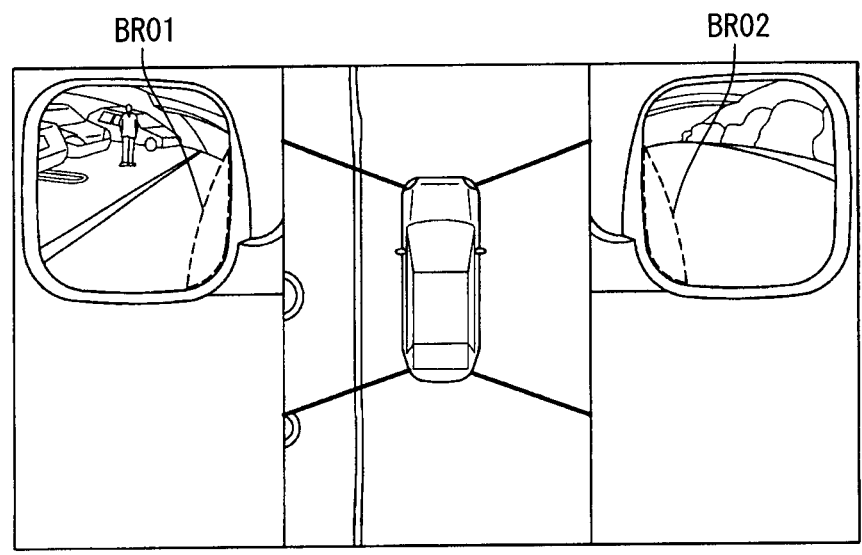
FIG. 20B is a illustrative diagram corresponding to FIG. 20A.

As shown in FIG. 20, the side mirror image may include a part BR01, BR02 of a body of the vehicle. Thus, the passenger recognizes intuitively that the side mirror image corresponds to the image reflected on the side mirror.

The above disclosure has the following aspects.

According to an aspect of the present disclosure, a display apparatus for a vehicle includes: a shooting element for shooting a predetermined area around the vehicle to obtain a shot image around the vehicle; an image conversion element for converting coordinates of the shot image to generate a mirror conversion image, wherein the mirror conversion image provides a first image of a first area around the vehicle reflected on an in-vehicle mirror, the first image being viewed from a passenger of the vehicle, and wherein the passenger sits down on a predetermined seat of the vehicle; and a display element for displaying the mirror conversion image.

In general, the passenger of the vehicle confirms an object at a rear side of the vehicle with the image reflected on the in-vehicle mirror. Thus, the passenger views the image on the mirror so that the passenger recognizes a type of the object, and a distance between the object and the vehicle. In the above apparatus, the passenger recognizes the type of the object and the distance between the object and the vehicle without viewing the image on the mirror.

Alternatively, the display element may further displays a mirror frame image showing a frame of the in-vehicle mirror, and the first image is arranged in the mirror frame image. In this case, the passenger recognizes intuitively that the mirror conversion image corresponds to the image on the mirror. Further, the mirror frame image may provide a same frame of the in-vehicle mirror.

Alternatively, the mirror conversion image may further provide a second image of a second area around the vehicle. The second image is arranged around the first image. The second area is disposed around the first area, and the mirror frame image is translucent with respect to the mirror conversion image. In this case, the passenger recognizes an area wider than the predetermined area around the vehicle in a case where the passenger directly views the mirror. Further, since the mirror frame image is translucent, the passenger recognizes an image at a boundary between the first image and the second image.

Alternatively, the in-vehicle mirror may include a plurality of mirror elements. The image conversion element generates a plurality of mirror conversion images, each of which provides the first image reflected on a respective mirror element, and the display element displays the plurality of mirror conversion images on a same display screen. In this case, the passenger recognizes the plurality of mirror conversion images simultaneously without viewing directly the plurality of mirror elements. Thus, the passenger easily confirms the rear side of the vehicle. Further, the display element may display the plurality of mirror conversion images in such a manner that the plurality of mirror conversion images are arranged on the same display screen to match a positional relationship between the plurality of mirror elements. Thus, the passenger recognizes intuitively and easily a relationship between the mirror conversion image and a corresponding mirror element.

Alternatively, the display element may further display an overhead image around the vehicle, and the overhead image includes a marker, which shows the first area around the vehicle. The passenger recognizes the first area around the vehicle, which corresponds to the image reflected on the mirror.

Alternatively, the display apparatus may further include: a first setting element for setting a display range of the mirror conversion image according to a first operation of a passenger in the vehicle. The passenger sets the display range of the mirror conversion image by his operation.

Alternatively, the display apparatus may further include: a second setting element for setting a slant angle of the in-vehicle mirror according to a second operation of a passenger in the vehicle. The image conversion element generates the mirror conversion image according to the set slant angle of the in-vehicle mirror.

Alternatively, the display apparatus may further include: a mirror angle sensor for detecting a slant angle of the in-vehicle mirror. The slant angle of the in-vehicle mirror is adjustable, and the image conversion element generates the mirror conversion image according to the detected slant angle of the in-vehicle mirror. The system displays the mirror conversion image corresponding to the image reflected on the mirror viewed from the passenger in association with the slant angle of the mirror.

Alternatively, the display element may further display the shot image of the shooting element on a same display screen of the mirror conversion image. The passenger confirms both of the mirror conversion image and the shot image simultaneously.

Alternatively, the display apparatus may further include: a left-right reverse image generation element for generating a left-right reverse image based on the shot image. The shooting element shoots a rear view of the vehicle so that the shot image shows the rear view of the vehicle. A left side of the left-right reverse image corresponds to a right side of the shot image, and a right side of the left-right reverse image corresponds to a left side of the shot image, and the display element further displays the left-right reverse image on a same display screen of the mirror conversion image. In general, when the shot image is a rear image of the vehicle, and the shot image is displayed on a screen, the displayed image is a reverse image with respect to the passenger of the vehicle. Because the shooting element shoots the rear side of the vehicle, when the passenger faces forward of the vehicle, a right side of the passenger corresponds to a left side of the shot image of the rear side of the vehicle. In the above apparatus, when the passenger views the left-right reverse image, the right side of the passenger corresponds to the right side of the left-right reverse image, and the left side of the passenger corresponds to the left side of the left-right reverse image.

Alternatively, the display apparatus may further include: an overhead image generation element for generating an overhead image of the vehicle based on the shot image. The overhead image shows an overhead view of the vehicle and around the vehicle, and the display element further displays the overhead image on a same display screen of the mirror conversion image. The passenger recognizes both of the mirror conversion image and the overhead image simultaneously.

Alternatively, the display apparatus may further include: an object detection element for detecting an object, which approaches the vehicle. The display element displays the mirror conversion image when the object detection element detects the object. In this case, the system informs the passenger of the approach of the object.

Alternatively, the display apparatus may further include: a vehicle speed detection element for detecting a vehicle speed of the vehicle; a shift position detection element for detecting a position of a shift lever of the vehicle; and a blinker operation detection element for detecting operation of a blinker of the vehicle. The display element displays the mirror conversion image when the vehicle stops, the position of the shift lever is a driving position, and the blinker turns on. When the driver drives the vehicle from a parking lot to enter into a traffic lane, it is necessary for the driver to confirm the rear of the vehicle. In this case, the apparatus automatically displays the mirror conversion image without operation of the passenger.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display apparatus for a vehicle comprising:
a shooting element for shooting a predetermined area around the vehicle to obtain a shot image around the vehicle;
an image conversion element for converting coordinates of the shot image to generate a mirror conversion image, wherein the mirror conversion image provides a first image of a first area around the vehicle reflected on a vehicle mirror, the first image being viewed from a passenger of the vehicle, and wherein the passenger sits down on a predetermined seat of the vehicle;
a display element for displaying the mirror conversion image;
a left-right reverse image generation element for generating a left-right reverse image based on the shot image; and
an image processor,
wherein the shooting element shoots at least a rear view of the vehicle so that the shot image shows at least the rear view of the vehicle,
wherein a left side of the left-right reverse image corresponds to a right side of the shot image, and a right side of the left-right reverse image corresponds to a left side of the shot image,
wherein the display element further displays the left-right reverse image on a same display screen of the mirror conversion image,
wherein the shooting element includes a plurality of shooting devices,
wherein the shooting devices shoot predetermined areas around the vehicle to obtain shot images around the vehicle, respectively,
wherein the image processor processes the shot images to generate a processed image,
wherein the processed image provides an overhead view showing the vehicle and a surrounding area of the vehicle, and
wherein the display element displays the mirror conversion image together with the processed image simultaneously.

2. The display apparatus according to claim 1,
wherein the shooting devices includes a front camera, a rear camera, a left side camera and a right side camera,
wherein the front camera shoots an image of a front view of the vehicle, the rear camera shoots an image of a rear view of the vehicle, the left side camera shoots an image of a left side view of the vehicle, and the right side camera shoots an image of a right side view of the vehicle, and
wherein the image processor generates the processed image by converting and combining the shot images.

3. A display apparatus for a vehicle comprising:
a shooting element for shooting a predetermined area around the vehicle to obtain a shot image around the vehicle;
an image conversion element for converting coordinates of the shot image to generate a mirror conversion image, wherein the mirror conversion image provides a first image of a first area around the vehicle reflected on a vehicle mirror, the first image being viewed from a passenger of the vehicle and wherein the passenger sits down on a predetermined seat of the vehicle;
a display element for displaying the mirror conversion image;
a vehicle speed detection element for detecting a vehicle speed of the vehicle;
a shift position detection element for detecting a position of a shift lever of the vehicle;
a blinker operation detection element for detecting operation of a blinker of the vehicle; and
an image processor,
wherein the display element displays the mirror conversion image when the vehicle stops, the position of the shift lever is a driving position, and the blinker turns on,
wherein the shooting element includes a plurality of shooting devices, and
wherein the shooting devices shoot predetermined areas around the vehicle to obtain shot images around the vehicle, respectively,
wherein the image processor processes the shot images to generate a processed image,
wherein the processed image provides an overhead view showing the vehicle and a surrounding area of the vehicle, and
wherein the display element displays the mirror conversion image together with the processed image simultaneously.

4. The display apparatus according to claim 3,
wherein the shooting devices includes a front camera, a rear camera, a left side camera and a right side camera,
wherein the front camera shoots an image of a front view of the vehicle, the rear camera shoots an image of a rear view of the vehicle, the left side camera shoots an image of a left side view of the vehicle, and the right side camera shoots an image of a right side view of the vehicle, and
wherein the image processor generates the processed image by converting and combining the shot images.

5. A display apparatus for a vehicle comprising:
a shooting element for shooting a predetermined area around the vehicle to obtain a shot image around the vehicle;
an image conversion element for converting coordinates of the shot image to generate a mirror conversion image, wherein the mirror conversion image provides a first image of a first area around the vehicle reflected on a vehicle mirror, the first image being viewed from a passenger of the vehicle, and wherein the passenger sits down on a predetermined seat of the vehicle;
a display element for displaying the mirror conversion image;
a clearance sonar for detecting an object, which approaches the vehicle; and
an image processor,
wherein the display element displays the mirror conversion image according to a detection result of the clearance sonar,
wherein the shooting element includes a plurality of shooting devices,
wherein the shooting devices shoot predetermined areas around the vehicle to obtain shot images around the vehicle, respectively,
wherein the image processor processes the shot images to generate a processed image,
wherein the processed image provides an overhead view showing the vehicle and a surrounding area of the vehicle, and
wherein the display element displays the mirror conversion image together with the processed image simultaneously.

6. The display apparatus according to claim 5,
wherein the shooting devices includes a front camera, a rear camera, a left side camera and a right side camera,
wherein the front camera shoots an image of a front view of the vehicle, the rear camera shoots an image of a rear view of the vehicle, the left side camera shoots an image of a left side view of the vehicle, and the right side camera shoots an image of a right side view of the vehicle, and
wherein the image processor generates the processed image by converting and combining the shot images.

* * * * *